United States Patent
Yasuda et al.

(10) Patent No.: US 6,914,234 B2
(45) Date of Patent: Jul. 5, 2005

(54) OPTICAL ENCODER AND SCALE FOR ENCODER

(75) Inventors: Shin Yasuda, Ashigarakami-gun (JP); Katsunori Kawano, Ashigarakami-gun (JP); Jiro Minabe, Ashigarakami-gun (JP); Tatsuya Maruyama, Ashigarakami-gun (JP); Masaaki Shimizu, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 226 days.

(21) Appl. No.: 10/233,438

(22) Filed: Sep. 4, 2002

(65) Prior Publication Data

US 2003/0155489 A1 Aug. 21, 2003

(30) Foreign Application Priority Data

Dec. 28, 2001 (JP) ........................................ 2001-400085

(51) Int. Cl.[7] ................................................ G01D 5/34
(52) U.S. Cl. .................................. 250/225; 250/231.13
(58) Field of Search ........................... 250/225, 231.13, 250/231.14, 231.16, 231.17, 231.18; 356/365, 616, 617, 618; 341/11, 13

(56) References Cited

U.S. PATENT DOCUMENTS 6,512,733 B1 * 1/2003 Kawano et al. ........ 369/110.01

FOREIGN PATENT DOCUMENTS

| JP | A 62-200224 | 9/1987 |
| JP | A 7-306058 | 11/1995 |
| JP | A 10-190148 | 7/1998 |
| JP | 2000-82213 | 3/2000 |

OTHER PUBLICATIONS

Viswanathan et al., "A Detailed Investigation of the Polarization–Dependent Surface–Relief–Grating Formation Process on Azo Polymer Films", Jpn. J. Appl. Phys., vol. 38, No. 10, pp. 5928–5937, 1999.

Ueki et al., "Single–Transverse–Mode 3.4–mW Emission of Oxide–Confided 780–nm VCSEL's", IEEE Photonics Technology Letters, vol. 11, No. 12, 1999.

* cited by examiner

*Primary Examiner*—Kevin Pyo
(74) *Attorney, Agent, or Firm*—Oliff & Berridge PLC

(57) ABSTRACT

Laser light output from a laser light source is irradiated onto a transmission-type scale. Due to movement of the transmission-type scale, a polarization angle of transmitted light varies in accordance with variations in orientations of half-wave plates arrayed in a longitudinal direction. It is difficult for the polarization angle to be affected by noise factors such as external light or the like. Light intensity of a polarized light component, which is transmitted through an analyzer and detected at a photo-detector, varies in accordance with the polarization angle. Thus, the light intensity varies as the transmission-type scale moves, and a detection signal is output to a movement amount computing device. When an amount of movement is computed on the basis of the signal, the exact amount of movement can be detected.

28 Claims, 29 Drawing Sheets

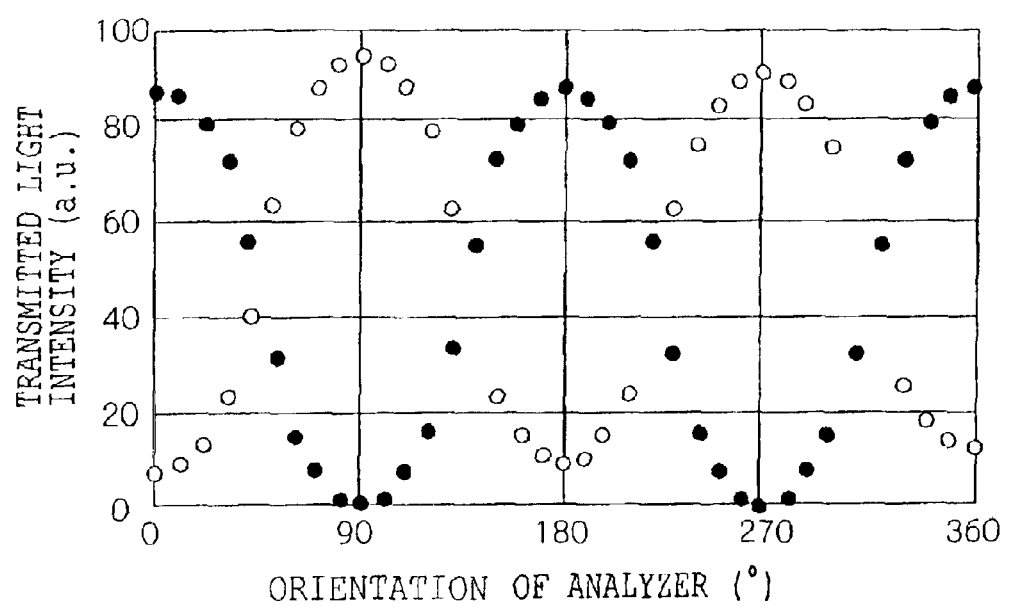
F I G . 5

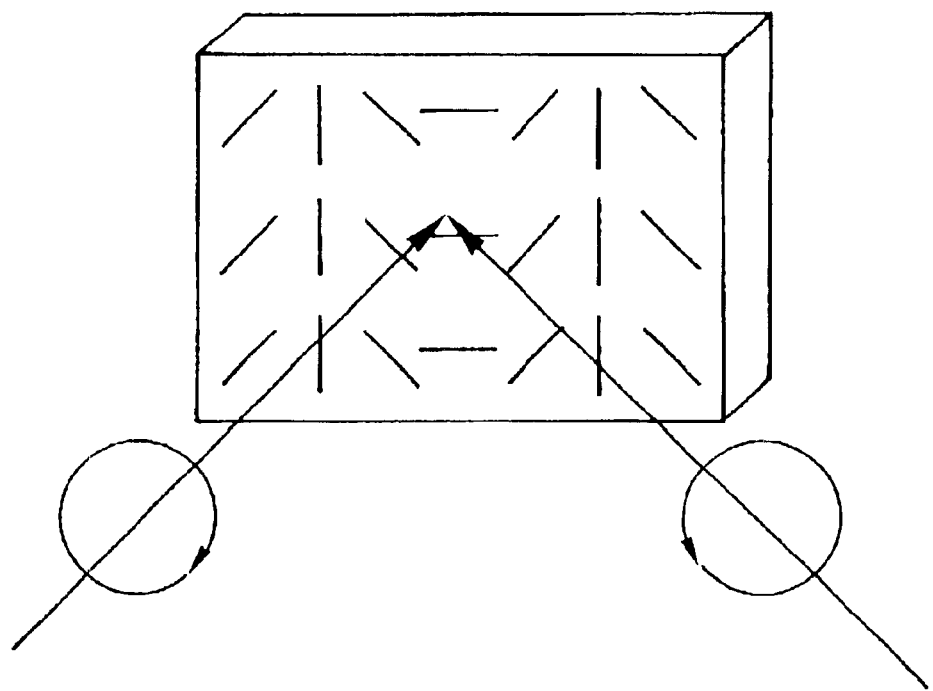
F I G. 25

OPTICAL ENCODER AND SCALE FOR ENCODER

BACKGROUND OF THE INVENTION

1. Field of the Invention

The present invention relates to an optical encoder and a scale for an encoder, and in particular, to a scale in which optically anisotropic regions, which vary the polarization state of incident laser light, are distributed, and to an optical encoder which detects an amount of movement by using the scale.

2. Description of the Related Art

A conventional optical encoder is formed so as to include a light source which outputs laser light, a scale which has a diffraction grating and is movable in a predetermined direction, a collimator lens which makes the laser light into parallel light and makes the parallel light incident on the diffraction grating of the scale, a photo-detector which detects changes in the intensity of the diffracted light at a predetermined position, and the like. In this optical encoder, the diffracted light intensity detected at a predetermined position varies periodically due to movement of the scale. This periodic variation can be associated with the pitch of the diffraction grating. Thus, the amount of movement of the scale (the amount of displacement from a reference point) can be detected from the period of the variation and the pitch of the diffraction grating.

For example, Japanese Patent Application Laid-Open (JP-A) No. 62-200224 discloses the optical encoder shown in FIG. 28. In this optical encoder, light emitted from a laser 1 is made into parallel light at a collimator lens 2, is transmitted through a beam splitter 3, and is incident on a diffraction grating 4 which moves. The lights which are diffracted by the diffraction grating 4 are reflected at mirrors 5, 5', and are again superposed at the beam splitter 3, and this light is detected at photo-detector 6. The amount of movement of the diffraction grating 4 can be known in accordance with the variation in intensity. However, in the structure shown in FIG. 28, the beam splitter, the lens, the mirrors and the like must be arranged spatially with very high precision. Accordingly, manufacturing is difficult, the size becomes larger of necessity, and costs increase.

Further, for example, JP-A No. 7-306058 discloses the optical encoder shown in FIG. 29. In this optical encoder, a surface-emitting laser is used as the light source in order to make the device more compact. Because the exiting angle of the beam from the surface-emitting laser is small, no collimator lens is needed, and the device can be made more compact. The beam emitted from a surface-emitting laser 41 is reflected at a linear scale 42, and the reflected light is received at light receiving elements of a photo-detector $43_1$. Further, the beam emitted from the surface-emitting laser 41 is transmitted through the linear scale 42, and the transmitted light is received at photo-detecting elements of a photo-detector $43_2$. Note that, in FIG. 29, the structure functions as an encoder provided that there is at least either one of the photo-detector $43_1$, which detects the light reflected from the scale, and the photo-detector $43_2$, which detects the light transmitted through the scale. In accordance with this structure, as compared with the optical encoder disclosed in JP-A 62-200224, the number of parts can be reduced, and the device can be made more compact.

However, in a conventional optical encoder in which the principle of movement detection is the varying of the laser light intensity due to movement of the scale, there is the serious problem that the detected light intensity greatly fluctuates due to fluctuations in the output light intensity of the laser light source, external light, positional offset between the scale and the detector, and the like, and the exact amount of movement cannot be detected. For example, if the distance between the scale and the detector is large, the signal intensity detected at the detector decreases, and the exact amount of movement cannot be detected. Thus, a conventional optical encoder has many restrictions from the standpoint of design, such as highly-precise alignment and an appropriately light-shielded environment are required, and the like, and can only be used in limited applications and environments.

Further, because the amount of movement is measured in accordance with the variation in the laser light intensity, it is difficult to confirm the direction of movement of the scale.

SUMMARY OF THE INVENTION

The present invention was created in light of the above-described circumstances, and an object of the present invention is to provide an optical encoder and a scale for an encoder which have excellent noise resistance and wide applicability, and which can detect an exact amount of movement. Another object of the present invention is to provide an optical encoder and a scale for an encoder which have a small number of parts and can be made compact.

In order to achieve the above objects, the optical encoder of the present invention comprises: an optical sensor section in which a scale and a detecting optical system are disposed so as to be one of relatively movable and relatively rotatable, and a plurality of optically anisotropic regions, which vary a polarization state of incident laser light to respectively different states, are distributed at the scale, and the detecting optical system includes a light source irradiating laser light onto the scale, a polarized light separating means separating a polarized light component of a predetermined polarization direction from laser light which has been one of transmitted through the scale and reflected by the scale, and a light intensity detecting means detecting a light intensity of the polarized light component which has been separated; and movement amount computing means for computing an amount of movement of the scale on the basis of a variation in light intensity detected at the optical sensor section.

In the optical encoder, at the detecting optical system, the laser light irradiated from the light source onto the scale is transmitted through the scale or reflected by the scale. A polarized light component of a predetermined polarization direction is, by the polarized light separating means, separated from the laser light which was transmitted or reflected. The light intensity of the separated polarized light component is detected by the light intensity detecting means. At the optical sensor section, the detecting optical system and the scale are disposed so as to be relatively moveable or relatively rotatable. When the detecting optical system and the scale move relative to one another or rotate relative to one another, the polarization state of the incident laser light is varied to different states (e.g., the polarization direction of the laser light is rotated or the like) in accordance with the distribution of the anisotropic orientations of the scale.

In accordance therewith, the light intensity of the polarized light component, which was separated by the polarized light separating means and detected by the light intensity detecting means, varies. Then, the amount of movement of the scale is computed by the movement amount computing means on the basis of the variation in the light intensity detected at the optical sensor section. The amount of movement of the scale can be computed by associating the variation in light intensity detected by the light intensity detecting means with the distribution of the anisotropic orientations of the scale, e.g., associating the period of the variation in the light intensity with the period of the distribution of the anisotropic orientations of the scale in a case in which the light intensity detected by the light intensity detecting means varies periodically.

In the optical encoder of the present invention, it is difficult for the amount of variation in the polarization state of the laser light due to the scale to be affected by fluctuations in the output light intensity of the laser light source and fluctuations due to noise factors such as external light or the like. Thus, there is no need for highly precise alignment or an appropriate light-shielded environment, and the range of applications and usage environments can be broadened. Further, detection of an exact amount of movement is possible. Moreover, because there is no need for light-shielding members and the like, the structure of the device is simple, and the device can be made more compact.

A surface-emitting laser is suitable as the light source of the optical encoder. When a surface-emitting laser is used as the light source, the spreading of the beam can be kept relatively low. Thus, a collimator lens and a condensing lens are not needed, and the number of parts can be reduced, and the device can be made more compact.

It is preferable to dispose a polarizer, which transmits laser light of a predetermined polarization direction, between the light source and the scale. When the polarization state of the light emitted from the laser light source fluctuates, the effects due to this fluctuation can be reduced by the polarizer, and the effect of reducing noise can be achieved.

Further, it is preferable to dispose an aperture, which reshapes the laser light to a predetermined beam size(e.g., beam diameter), between the light source and the scale. The amplitude of the detection signal fluctuates in accordance with the beam size and the scale period. When the beam size of the laser light emitted from the light source fluctuates, laser light of a predetermined beam size is irradiated onto the scale due to the aperture. Fluctuations in the amplitude are prevented, and the effect of reducing noise can be achieved.

A polarizer, which transmits a linearly polarized light component of a predetermined polarization direction from the incident light, can be used as the polarized light separating means. Further, a polarized light separating element, such as a polarizing beam splitter, a polarizing plate, a polarizing film or the like which separates the incident light into two polarized light components having different polarization directions, may be used as the polarized light separating means.

When using a polarized light separating means which separates incident light into two polarized light components having different polarization directions, the light intensity detecting means detects the light intensity for each of the polarized light components separated by the polarized light separating means. The movement amount computing means computes the amount of movement of the scale by associating the variation in the polarization angle obtained from the light intensity ratio of the detected polarized light components or the variation in the light intensity difference of the detected polarized light components, with the distribution of the anisotropic orientations of the scale. By using the ratio or the difference of the light intensities of the polarized light components which have been separated in two, the noise factors can be eliminated, and the amount of movement can be detected with high accuracy. In this case as well, when the polarization angle obtained from the light intensity ratio of the detected polarized light components or the light intensity difference of the detected polarized light components varies periodically, the movement amount computing means can compute the amount of movement of the scale by associating the period of the variation in the polarization angle or the light intensity difference with the period of the distribution of the anisotropic orientations of the scale.

In the optical encoder, interference light due to plural laser lights or multiple-interference light due to interference of diffracted lights can be irradiated onto the scale. Interference fringes are formed on the scale surface by the irradiation of the interference light. Therefore, in the same way as in a case in which laser light of a small beam size is irradiated, the irradiation of light which is not needed for movement amount detection can be reduced, and the S/N of the detection signal can be improved. In order to improve the S/N of the detection signal, it is preferable that the pitch of the interference fringes be an integer multiple of a half-period of the scale period (the period of the distribution of the anisotropic orientations by the optically anisotropic regions).

When laser light having a polarization distribution within the beam is irradiated onto the scale, the beam size and the polarization distribution are optimized with respect to the distribution of the anisotropic orientations of the scale such that the detected light intensity becomes a maximum, and the S/N of the detection signal can be improved. Further, when laser light having a polarization distribution within the beam is irradiated through a polarizer which transmits laser light of a predetermined polarization direction, in the same way as in a case in which laser light of a small beam size is irradiated, the irradiation of light which is not needed for movement amount detection can be reduced, and the S/N of the detection signal can be improved.

The distribution of the optically anisotropic regions at the scale can be formed such that the state of the variation in the detected light intensity differs in a case in which the scale and the detecting optical system are moved or rotated in a predetermined direction, and in a case in which the scale and the detecting optical system are moved or rotated in a direction opposite to the predetermined direction. In this way, the direction of the movement or rotation can be specified by the state of the variation in the detected light intensity.

The scale used in an optical encoder has the feature that a plurality of optically anisotropic regions, which vary the polarization state of the incident laser light to respectively different states, e.g., rotate the polarization direction of the laser light, are distributed at the scale. In order to improve the precision of detecting the amount of movement, it is preferable that the optically anisotropic regions are distributed such that the distribution of the anisotropic orientations is periodic.

The optically anisotropic regions may be, for example, regions which function as waveplates. For example, in the case of a transmission-type scale, the optically anisotropic regions may be regions functioning as half-wave plates, whereas in the case of a reflection-type scale, the optically anisotropic regions may be regions functioning as quarter-wave plates. Further, the optically anisotropic regions can be regions having photo-induced anisotropy which is induced by the irradiation of light. Photo-induced birefringence and photo-induced dichroism are types of photo-induced anisotropy.

The optically anisotropic regions can be formed by inducing birefringence by irradiating light onto either a recording material containing a polymer compound (which may be a polymer liquid crystal) having a photoisomerizing group in a side chain, or a recording material containing a polymer compound in which photoisomerizing molecules are dispersed. The polymer compound preferably has an azobenzene structure, and at least one type of polymer selected from the group of polyesters is even more preferable.

The distribution of the optically anisotropic regions can be formed by, for example, recording a polarization hologram. Further, the distribution of the optically anisotropic regions can be formed by varying the thickness of an optically anisotropic material at each place.

BRIEF DESCRIPTION OF THE DRAWINGS

FIG. 5 is a graph showing the relationship between the orientation of an analyzer measured before and after irradiation of pump light, and transmission intensity of probe light.

FIG. 25 is a perspective view showing a state of recording a polarization hologram by using circularly polarized lights which rotate in mutually opposite directions.

DESCRIPTION OF THE PREFERRED EMBODIMENTS

Hereinafter, embodiments of the present invention will be described in detail with reference to the drawings.

(First Embodiment)

[Structure of Optical Encoder]

Figure 1:
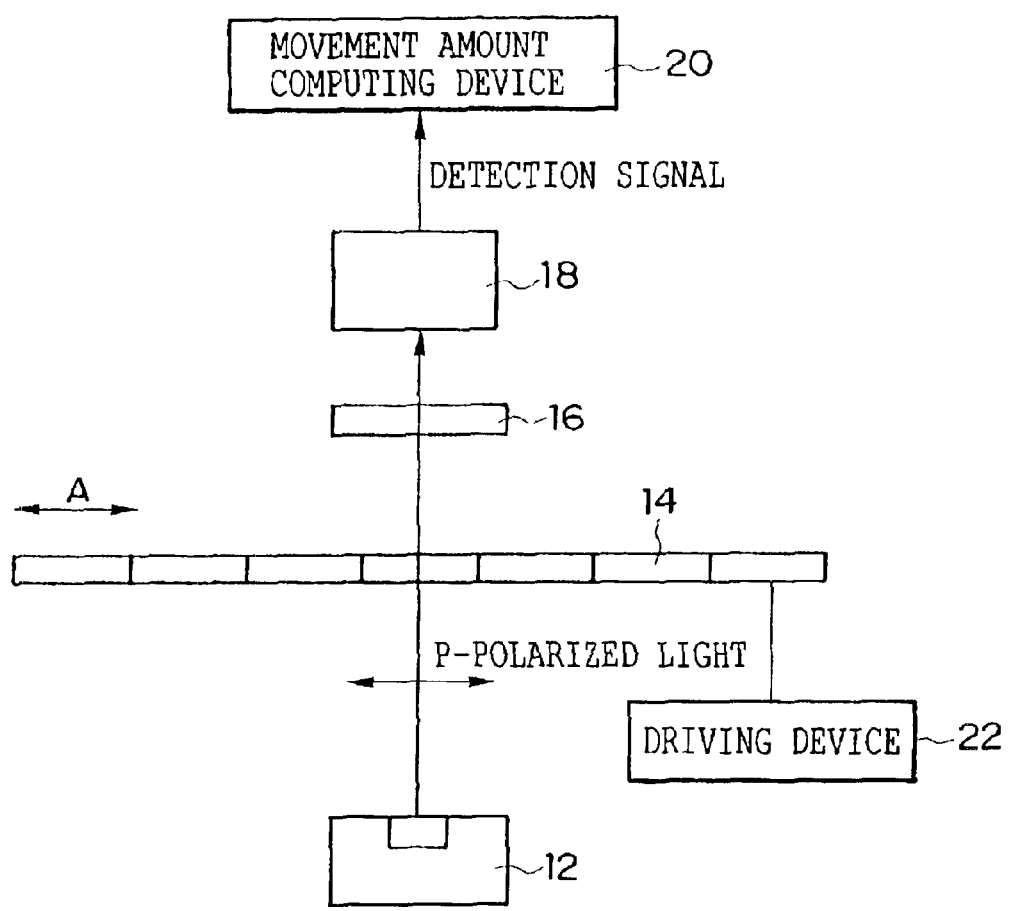
FIG. 1 is a schematic diagram showing the structure of an optical encoder relating to a first embodiment.

As shown in FIG. 1, the optical encoder relating to the embodiment of the present invention has a laser light source 12 which outputs linearly polarized light having a predetermined polarization direction. A transmission-type scale 14 which is elongated and has a plurality of half-wave plates which rotate the polarization direction (plane of polarization) of the laser light, an analyzer 16 which selectively transmits linearly polarized light of a predetermined polarization direction, and a photo-detector 18 which detects the intensity of the laser light transmitted through the analyzer 16, are provided in that order at the light exiting side of the laser light source 12.

The transmission-type scale 14 is disposed such that the laser light is substantially orthogonal incident thereon, and is structured so as to be movable in the directions of arrow A, which run along the longitudinal direction of the scale, via an unillustrated driving mechanism controlled by a driving device 22. The photo-detector 18 is connected to a movement amount computing device 20 which computes the amount of movement on the basis of a detection signal from the photo-detector 18. The movement amount computing device 20 maybe structured, for example, by a personal computer equipped with a CPU, a ROM, and a RAM.

Figure 2A:
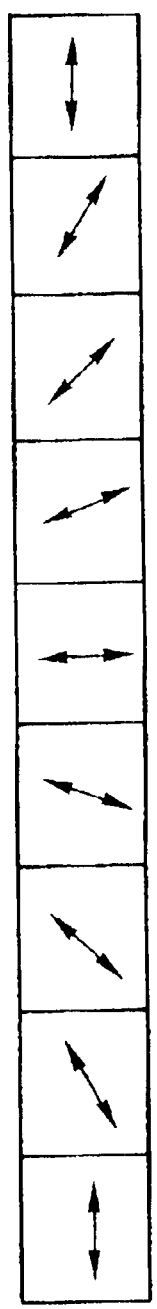
FIG. 2A is a diagram showing the orientations of half-wave plates arrayed at a transmission-type scale.
Figure 2B:
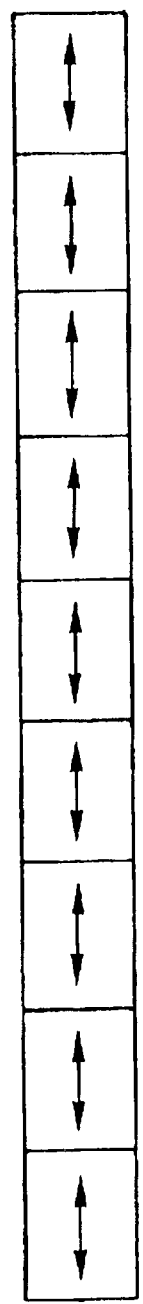
FIG. 2B is a diagram showing polarization directions of incident light.

The laser light source 12 is formed by a surface-emitting laser which can emit laser light from a substrate surface. A surface-emitting laser can keep the spreading of the beam relatively low due to the design of the configuration of the aperture. Thus, because there is no need for a collimator lens or a condensing lens, a surface-emitting laser is advantageous in making the device smaller and lower cost. For example, the vertical cavity surface-emitting lasers (VCSEL) disclosed in IEEE Photon. Technol. Lett., 11, 1539 (1999) or the like can be suitably used.

orientations of the half-wave plates rotate continuously along the longitudinal direction counterclockwise by 22.5° each. When the polarization direction of the linearly polarized light incident on the half-wave plate is θ from the principal axis, the polarization direction of the linearly polarized light which exits is rotated to −θ from the principal axis. For example, in a case in which the transmission-type scale 14 shown in FIG. 2A is used, when linearly polarized lights of the polarization directions shown in FIG. 2B are incident on the respective half-wave plates, the polarization directions of the linearly polarized lights are rotated in accordance with the orientations of the respective half-wave plates, such that linearly polarized lights of the polarization directions shown in FIG. 2C exit.

[Method of Fabricating Transmission-Type Scale]

Figure 3B:
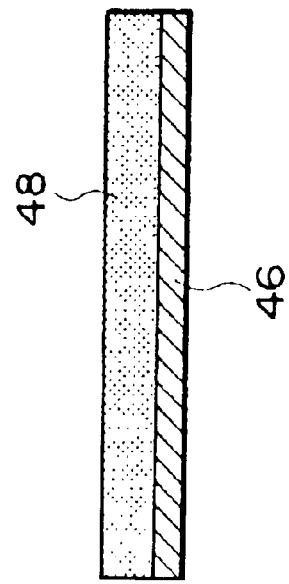
FIG. 3B is a cross-sectional view showing a layer structure of a reflection-type scale.
Figure 3A:
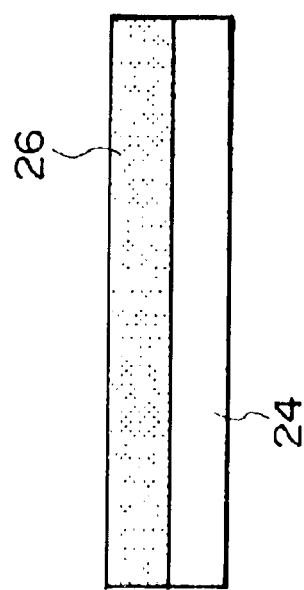
FIG. 3A is a cross-sectional view showing a layer structure of the transmission-type scale.

The transmission-type scale 14 can be fabricated by utilizing the recording medium shown in FIG. 3A, in which a recording layer 26, which exhibits photo-induced anisotropy (birefringence or dichroism) and at which the induced anisotropy can be recorded and held, is formed on one surface of a transparent substrate 24 which is a glass substrate or the like, and by recording the photo-induced anisotropy such that half-wave plates are formed on the recording layer 26 of this recording medium. Accordingly, the orientations of the half-wave plates correspond to the orientations of principal axes of ordinary half-wave plates, and mean the orientations of merged electric field vectors which are irradiated in order to record the photo-induced anisotropy.

Polymers having an azobenzene structure (hereinafter called "azopolymers"), which have a high photo-induced birefringence and excellent recording stability, are suitable as the recording material forming the recording layer 26. When linearly polarized light is irradiated onto azobenzene, the azobenzene which is oriented in the polarization direction of the linearly polarized light exhibits a trans-cis-trans photoisomerization cycle as follows.

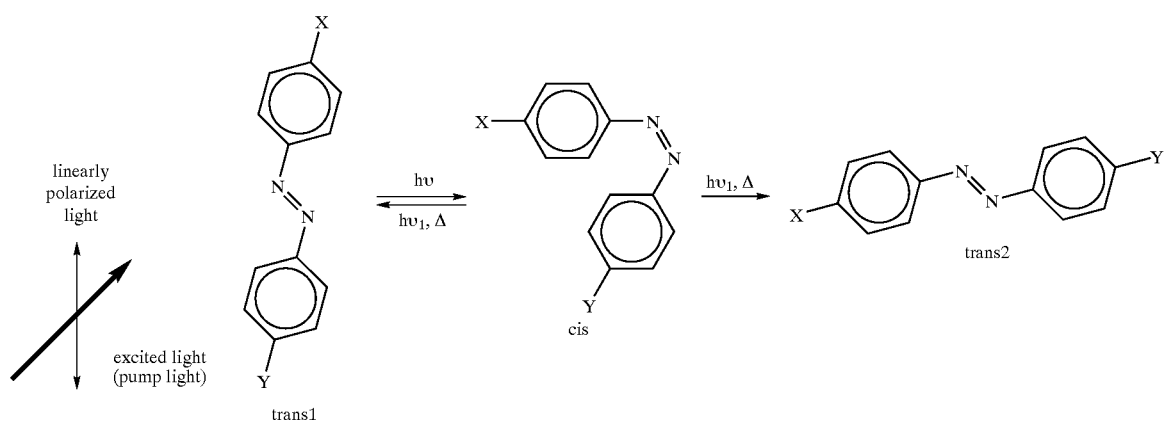

As shown in FIG. 2A, the transmission-type scale 14 is structured by a plurality of half-wave plates having different orientations being arrayed along the longitudinal direction, such that the orientations of the half-wave plates vary periodically along the longitudinal direction of the scale. Note that, FIG. 2A illustrates an array of half-wave plates of one period. However, half-wave plates of a plurality of periods may be arrayed at the scale. At the scale, nine half-wave plates per one period are arrayed such that the When the trans-isomer relaxes in a direction orthogonal to the polarization direction, it is no longer excited by the light and remains stable in the direction thereof. In this way, in the azobenzene, the trans-isomers are oriented in a direction orthogonal to the polarization direction of the irradiated light. Due to this orientation, birefringence and dichroism are induced. Among azopolymers, a polyester, which is shown by the following formula and has an azobenzene structure in the side chain, is suitable as the recording material because it has particularly high photo-induced birefringence and stability.

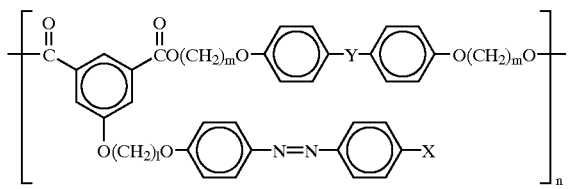

In the formula, X represents a cyano group, a methyl group, a methoxy group, or a nitro group, and Y represents a bivalent coupling group such as an oxy group, a carbonyl group, or a sulfonyl group. Further, l and m represent integers from 2 to 18, and n represents an integer from 5 to 500.

Here, birefringence is induced in the recording layer (azopolymer layer) formed by the azopolymer having the following chemical structure, such that the half-wave plates are formed. The induced birefringence can be recorded and held stably.

Polyester Having Cyanoazobenzene in the Side Chain

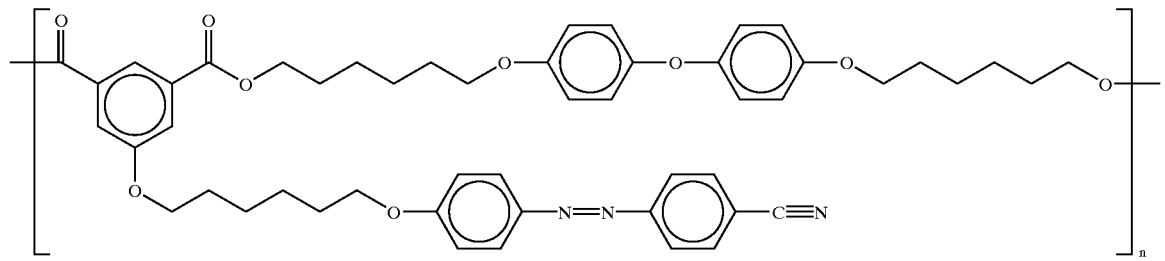

As described above, birefringence is induced by irradiating pump light which is linearly polarized light and is sensitive to azopolymers. The magnitude of the induced birefringence can be investigated by using probe light which is linearly polarized light and is not sensitive to azopolymers. For example, an oscillation line of 515 nm of an argon ion laser can be used as the pump light. Further, an oscillation line of 633 nm of a helium neon laser can be used as the probe light.

Figure 4:
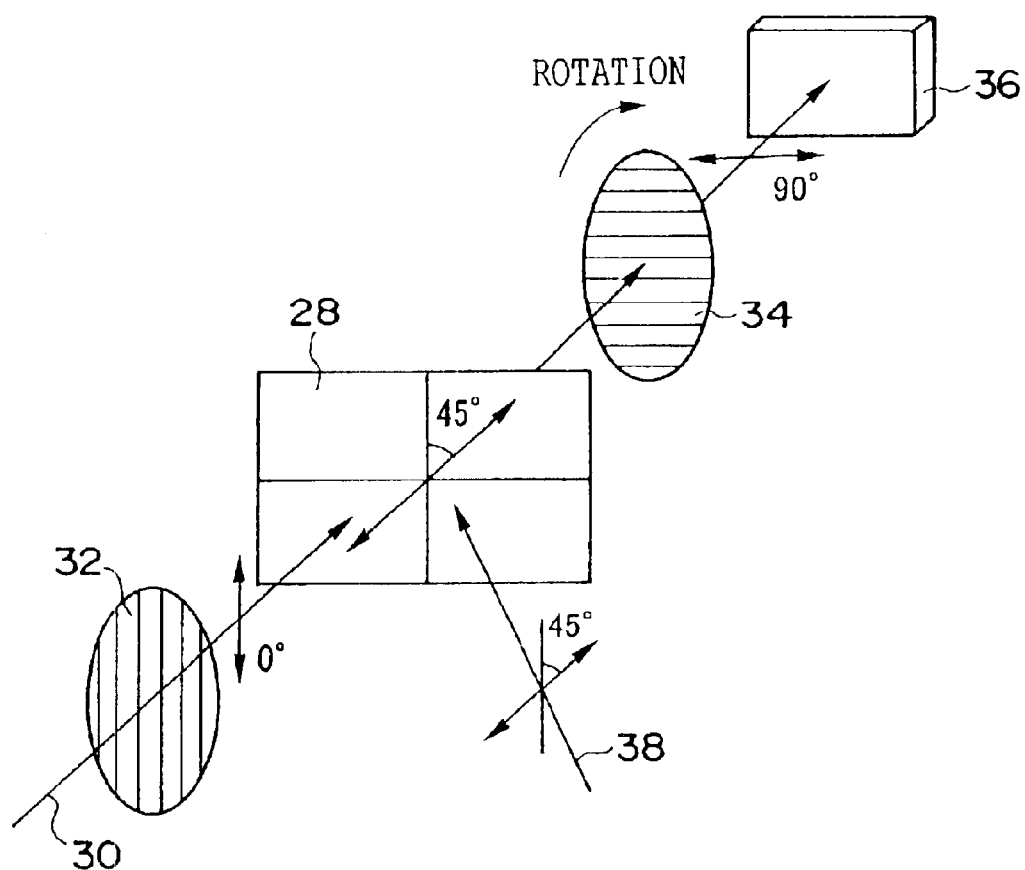
FIG. 4 is a schematic view showing the structure of an optical system for measuring birefringence by using probe light.

FIG. 4 shows the optical system for measuring the birefringence recorded on the azopolymer layer. This optical system is a cross-Nicol optical system in which a polarizer 32, a recording medium 28 which is the object of measurement, and an analyzer 34 are disposed in that order along the optical path of probe light 30, and the orientation (0°) of the polarizer 32 and the orientation (90°) of the analyzer 34 are orthogonal to one another. A photo-detector 36, which detects the intensity of the probe light which has been transmitted through the analyzer 34, is disposed at the light exiting side of the analyzer 34.

If the anisotropy of the azopolymer layer has not been induced, the polarization direction (0°) of the probe light 30 which has been transmitted through the polarizer 32 is not rotated, and the probe light 30 cannot be transmitted through the analyzer 34. On the other hand, when pump light 38, which is linearly polarized light of a 45° orientation, is irradiated onto the azopolymer layer, anisotropy is induced in the orientation thereof. In this case, the polarization direction (0°) of the probe light 30 which has been transmitted through the polarizer 32 is rotated 90° by the recording medium 28, and the probe light 30 is transmitted through the analyzer 34. The intensity of this transmitted light is detected at the photo-detector 36, and the magnitude of the photo-induced birefringence is computed from the detected intensity of the transmitted light.

Using the optical system shown in FIG. 4, linearly polarized light of a 45° orientation (and having an oscillation line of 515 nm and an intensity of 5 W/cm$^2$) was irradiated for 5 seconds from an argon ion laser as the pump light 38 onto an azopolymer layer of a thickness of 6 μm. Thereafter, the probe light 30, which had been transmitted through the polarizer 32, was irradiated onto the portion which had been irradiated by the pump light, and while rotating the orientation of the analyzer 34, the intensity of the probe light 30 which was transmitted through the analyzer 34 was measured at the photo-detector 36. The results of this measurement are shown in FIG. 5. The horizontal axis is the orientation of the analyzer 34, and the vertical axis is the intensity of the probe light which was transmitted through the analyzer 34. Note that the intensity of the transmitted light on the vertical axis is expressed in arbitrary units (abbreviated as "a.u."). The black circles show the intensity of the transmitted light before irradiation of pump light, and the white circles show the intensity of the transmitted light after irradiation of pump light.

As can be understood from FIG. 5, before irradiation of the pump light, when the orientation of the analyzer 46 was 0° or 180°, the transmitted light intensity was a maximum, and when the orientation of the analyzer 46 was 90° or 270°, the transmitted light intensity was a minimum. In contrast, after irradiation of the pump light, when the orientation of the analyzer 46 was 90° or 270°, the transmitted light intensity was a maximum, and when the orientation of the analyzer 46 was 0° or 180°, the transmitted light intensity was a minimum. Namely, at the portion irradiated by the pump light 38, the function of a half-wave plate was induced in the azopolymer layer, and the polarization direction of the probe light transmitted through the azopolymer layer was rotated by 90°.

Note that, in order to induce the function of a half-wave plate, a photo-induced birefringence (the change in birefringence due to the illumination of light) Δn must be a value satisfying the following formula. Here, d is the thickness of the recording layer (the azopolymer layer), and λ is the wavelength of the probe light.

$$\Delta n \cdot d = \frac{(m+1)\lambda}{2} \text{(wherein } m \text{ is 0 or a positive integer)}$$

Further, it was confirmed that, when the azopolymer layer after recording is stored at room temperature, the photo-induced birefringence Δn remains constant over several weeks or more even in natural light.

Accordingly, the above-described transmission-type scale 14 can be fabricated by using an elongated recording medium on which is formed a recording layer formed from a recording material such as an azopolymer or the like, and by, in the same way as described above, successively irradiating pump light of a different polarization direction onto each place so as to modulate the orientations of the birefringence to multiple angles and record the birefringence, such that a plurality of half-wave plates having different orientations are arrayed as shown in FIG. 2A.

[Operation of Optical Encoder]

Figure 2C:
FIG. 2C is a diagram showing polarization directions of exiting light.

Next, the operation of the optical encoder shown in FIG. 1 will be explained. The laser light, which is output from the laser light source 12 as linearly polarized light having a predetermined polarization direction, is irradiated onto the transmission-type scale 14 disposed at the light exiting side of the laser light source 12, and the polarization direction is rotated by a predetermined angle in accordance with the orientation of the half-wave plate formed at the irradiated portion. When the transmission-type scale 14 is moved in the direction of arrow A via the unillustrated driving mechanism by the driving device 22, as shown in FIGS. 2A through 2C, the polarization directions (polarization angles) of the transmitted light vary periodically in accordance with the changes in the orientations of the half-wave plates arrayed in the longitudinal direction. As shown in FIG. 2A, because the orientations of the half-wave plates are rotated continuously along the longitudinal direction of the scale, the polarization direction of the transmitted light changes due to the movement of the scale, just as if the half-wave plates were rotating.

Then, only the polarized light component of a predetermined polarization direction (e.g., the P-polarized light component) among the laser light which has been transmitted through the transmission-type scale 14, is transmitted through the analyzer 16. The intensity of the polarized light component which has been transmitted through the analyzer 16 is detected at the photo-detector 18. Here, given that the change in intensity of the laser light which is transmitted through the transmission-type scale 14 due to noise factors is $\Delta l$, the change in the intensity of the laser light, which has a plane of polarization inclined by angle $\theta$ with respect to the transmission axis of the analyzer 16, is $\Delta l(\cos \theta)^2$ which is small. The light intensity of the polarized light component which is transmitted through the analyzer 16 varies in accordance with the polarization angle of the laser light which is transmitted through the scale. Thus, the detected light intensity varies periodically in accordance with the movement of the transmission-type scale 14, and a sinusoidal detection signal is output to the movement amount computing device 20. When the transmission-type scale 14 has moved by one period, a signal of two periods is detected.

The movement amount computing device 20 computes the amount of movement on the basis of the detection signal. For example, the wave number can be counted from the signal waveform of the detection signal, and the amount of movement of the transmission-type scale 14 can be computed in accordance with the following formula by using the counted wave number.

amount of movement=amount of movement per one period×wave number

As described above, in the optical encoder relating to the present embodiment, the polarization angle of the transmitted light varies periodically due to the movement of the scale, and the light intensity detected by the photo-detector varies in accordance with the polarization angle. Thus, it is difficult for the amount of change in the detected light intensity to be affected by fluctuations in the output light intensity of the laser light source and fluctuations caused by noise factors such as external light and the like, and an exact amount of movement can be detected. In this way, there is no need for highly precise alignment or an appropriate light-shielded environment, and the optical encoder can be utilized for various applications and in various environments, and can be made compact.

Further, because a surface-emitting laser, which can keep the spreading of the beam relatively low, is used as the light source, there is no need for a collimator lens or a condensing lens. Thus, the device can be made more compact and less expensive.

Moreover, in a conventional optical encoder which detects the amount of movement by varying the laser light intensity due to movement of the scale, when the scale moves one period, only a signal of one period is detected. However, in the present embodiment, because a signal of two periods is detected when the scale moves one period, high resolution can be realized.

(Second Embodiment)
(Structure of Optical Encoder)

Figure 6:
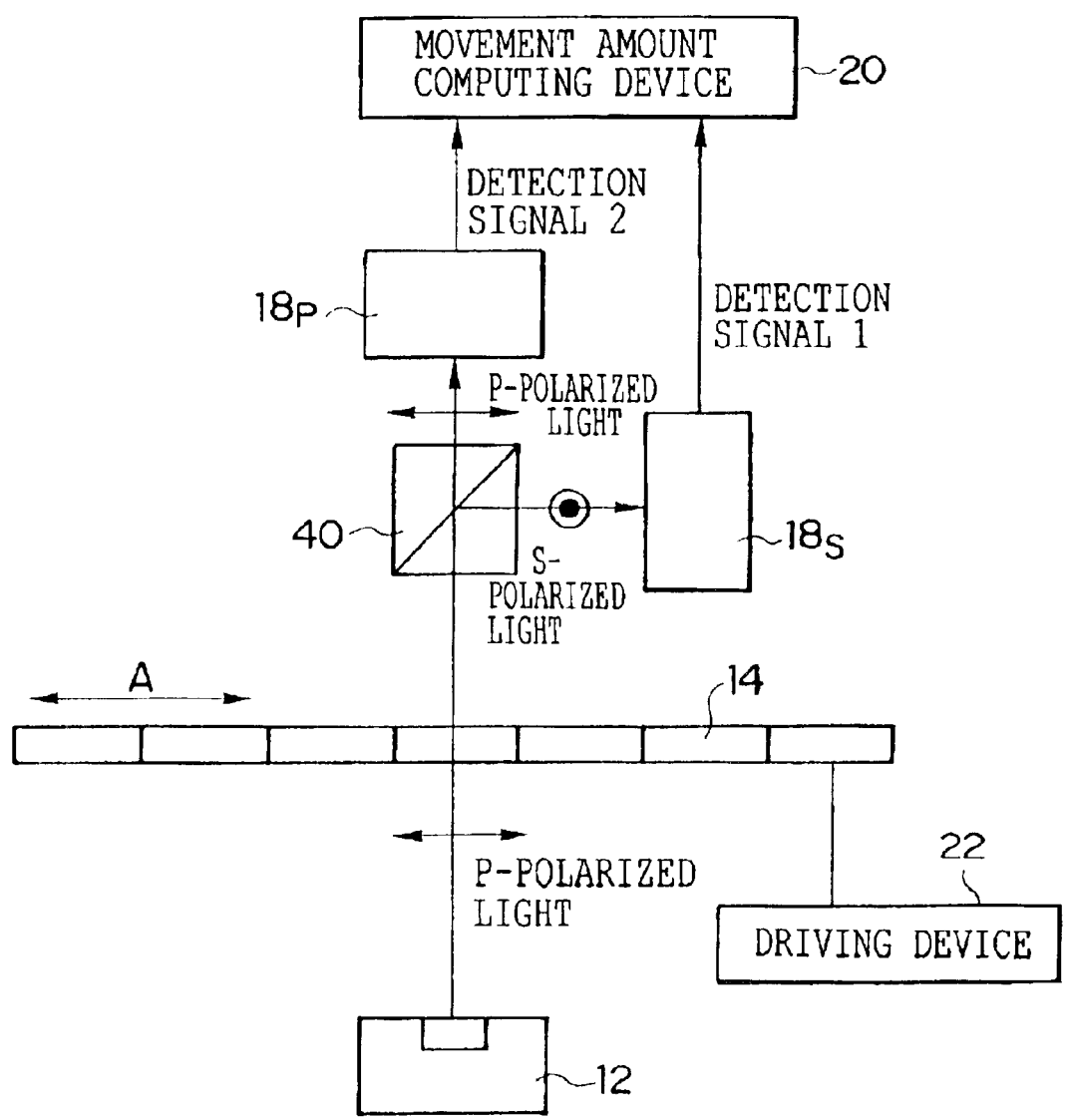
FIG. 6 is a schematic diagram showing the structure of an optical encoder relating to a second embodiment.

As shown in FIG. 6, the optical encoder relating to the second embodiment has the same structure as that of the optical encoder relating to the first embodiment, except that, in the second embodiment, the laser light which is transmitted through the transmission-type scale is separated into two light waves whose electric field vectors are orthogonal to one another, and each light wave is detected at a photo-detector. Thus, portions which are same as those of the first embodiment are denoted by the same reference numerals and description thereof is omitted.

In the optical encoder, a polarizing beam splitter 40 is provided at the light exiting side of the transmission-type scale 14. The polarizing beam splitter 40 divides the incident laser light into two light waves (e.g., S polarized light and P polarized light) such that the transmitted light and the reflected light become polarized lights whose electric field vectors are orthogonal to one another. Hereinafter, a case will be described in which the P-polarized light component is transmitted through and the S-polarized light component is reflected.

A photo-detector 18p, which detects the intensity of the P-polarized light component, is disposed at the transmitted light exiting side of the polarizing beam splitter 40. A photo-detector 18s, which detects the intensity of the S-polarized light component, is disposed at the reflected light exiting side of the polarizing beam splitter 40. Further, each of the photo-detector 18s and the photo-detector 18p is connected to the movement amount computing device 20 which computes the amount of movement on the basis of the detection signals from the photo-detectors.

[Operation of Optical Encoder]

Next, operation of the optical encoder shown in FIG. 6 will be described. Laser light, which is output from the laser light source 12 as linearly polarized light having a predetermined polarization direction, is irradiated onto the transmission-type scale disposed at the light exiting side of the laser light source 12. The polarization direction is rotated by a predetermined angle in accordance with the orientation of the half-wave plate formed at the irradiated portion. When the transmission-type scale 14 is moved in the direction of arrow A via the unillustrated driving mechanism by the driving device 22, as shown in FIGS. 2A through 2C, the polarization angle of the transmitted light varies periodically in accordance with the changes in the orientations of the half-wave plates arrayed in the longitudinal direction.

Then, the laser light, which has been transmitted through the transmission-type scale 14, is separated into an S-polarized light component and a P-polarized light component by the polarizing beam splitter 40. Intensity Is of the S-polarized light component is detected at the photo-detector 18s, and intensity Ip of the P-polarized light component is detected at the photo-detector 18p. The light intensity of a polarized light component of a predetermined polarization direction varies in accordance with the polarization angle of the laser light which is transmitted through the scale. Thus, each of the light intensities Is, Ip varies periodically in accordance with the movement of the transmission-type scale 14. In this way, a sinusoidal detection signal 1 (representing the changes in the intensity Is) is output to the movement amount computing device 20 from the photo-detector 18s, and a sinusoidal detection signal 2 (representing the changes in the intensity Ip), whose phase difference from the detection signal 1 is π, is output to the movement amount computing device 20 from the photo-detector 18p. When the transmission-type scale 14 moves by one period, signals of two periods are detected for each of the light intensities Is, Ip.

The movement amount computing device 20 computes the movement amount on the basis of the detection signal 1 and the detection signal 2. First, a third signal, from which noise is removed, is obtained by using the detection signal 1 and the detection signal 2. Thereafter, the amount of movement of the transmission-type scale 14 is computed in the same way as in the first embodiment such as by, for example, computing the amount of movement by counting the wave number from the signal waveform of the third signal. Moreover, when computing the amount of movement, high resolution can be achieved by utilizing a method for electrically dividing the obtained detection signal by using an interpolation circuit as disclosed in JP-A No. 10-190148.

One method of removing noise is a method of determining the polarization θ of the light transmitted through the transmission-type scale 14. The polarization θ of the transmitted light can be determined from the relationship of the following formula. Even if the polarized light of the source of light emission fluctuates or the light signal intensity fluctuates due to misalignment, the effects thereof are reflected in both the intensity Is of the S-polarized light component and the intensity Ip of the P-polarized light component. Thus, there is no change in the polarization θ obtained by the following formula. Accordingly, highly precise detection of the amount of movement can be achieved by using the polarization θ.

$$\theta = \tan^{-1}\sqrt{\frac{Is}{Ip}} \text{ (wherein } 0 \leq \theta \leq \pi/2\text{)}$$

Another method of removing noise is a method of determining the difference between the intensity Is of the S-polarized light component and the intensity Ip of the P-polarized light component. When the intensity Is and the intensity Ip are affected to the same extent by a noise signal such as external light, the noise factors can be removed by determining the difference Is–Ip. Highly precise detection of the amount of movement can be achieved by using the difference Is–Ip.

[Effects of Noise Removal in Accordance with Computer Experimentation]

Figure 7:
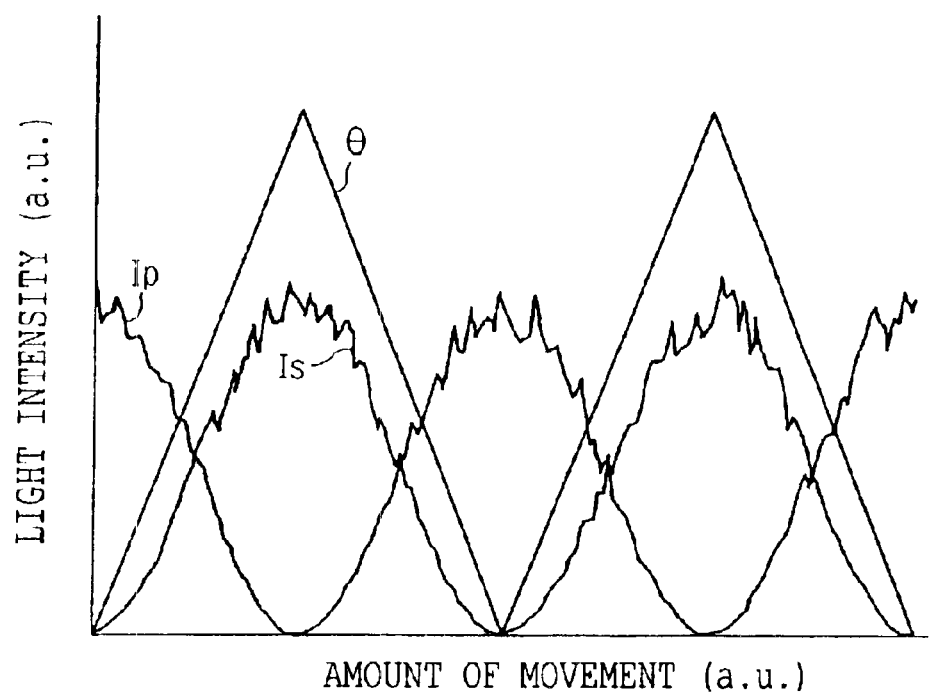
FIG. 7 is a graph showing results of determining, by computer experimentation, changes in intensities Ip, Is and changes in a polarization angle θ, with respect to a scale movement amount when noise factors exist.

In the optical encoder shown in FIG. 6, given that the linearly polarized light emitted from the laser light source 12 is P-polarized light, the polarization states of the laser lights detected at the photo-detectors 18s, 18p are S-polarized light (intensity Is) and P-polarized light (intensity Ip), respectively. The changes in Ip, Is and the polaraization θ in a case in which the output light intensity of the laser light source 12 was varied randomly at the time the scale moved one period, were investigated by computer experimentation. The results thereof are shown in FIG. 7. Note that the polarization direction of the light output from the laser light source 12 was unchanged.

Figure 8:
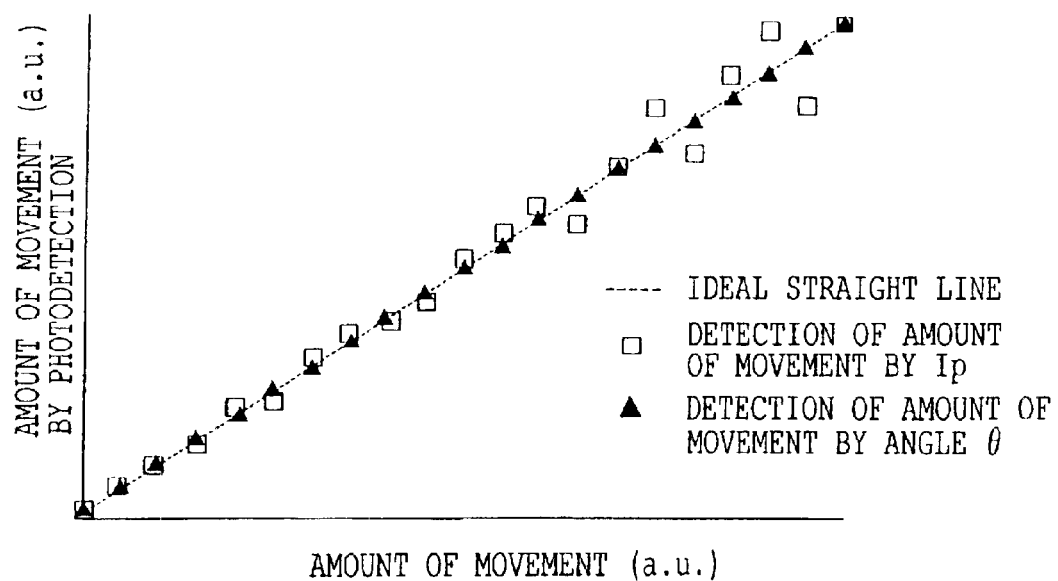
FIG. 8 is a graph showing results of determining, by computer experimentation, a movement amount computed on the basis of the polarization angle θ, a movement amount computed on the basis of the value of the intensity Ip, and the correlation with the actual movement amount.

As shown in FIG. 7, the polarization θ is an ideal signal waveform from which the noise which can be seen in Ip, Is is completely removed, and is substantially rectilinear at $0 \leq \theta \leq \pi/2$. The correlation between the amount of movement computed on the basis of the polarization θ and the actual amount of movement, and the correlation between the amount of movement computed on the basis of the value of the intensity Ip of the P-polarized light component and the actual amount of movement are shown in FIG. 8. From FIG. 8, it can be understood that, when the amount of movement is computed on the basis of the value of the intensity Ip, the error increases as the amount of movement increases, but when computation is carried out on the basis of the polarization angle θ, the amount of movement can be measured extremely accurately.

Figure 9:
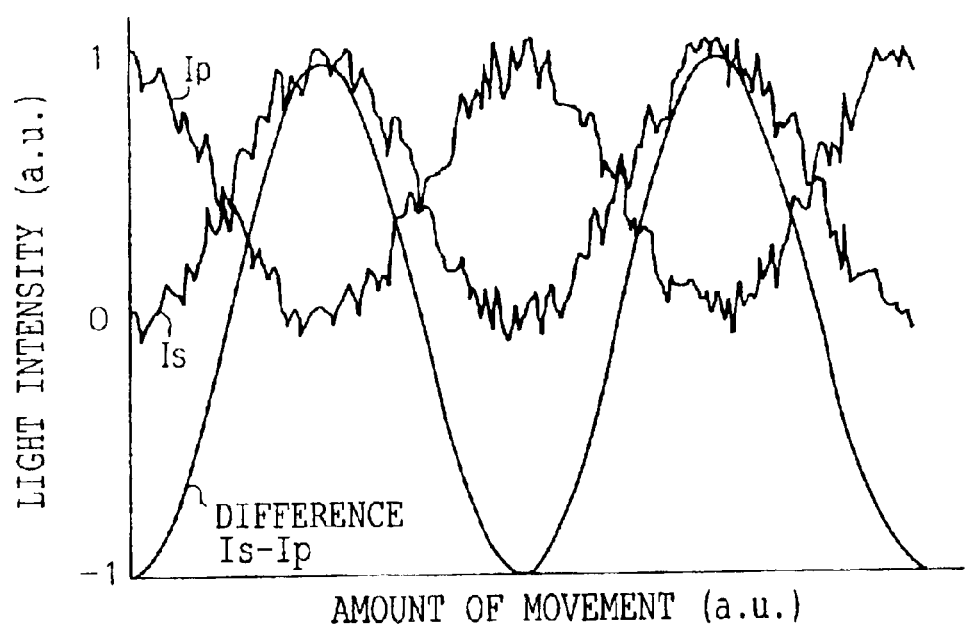
FIG. 9 is a graph showing results of determining, by computer experimentation, changes in the intensities Ip, Is and changes in the difference Is–Ip, with respect to a scale movement amount when noise factors exist.
Figure 10:
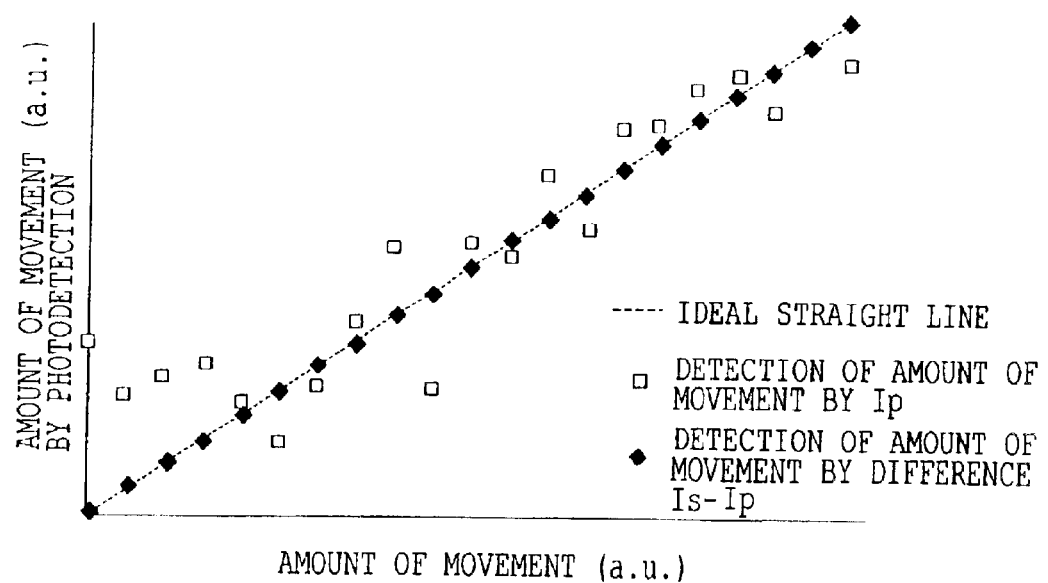
FIG. 10 is a graph showing the results of determining, by computer experimentation, a movement amount computed on the basis of the difference Is–Ip, a movement amount computed on the basis of the value of the intensity Ip, and the correlation with the actual movement amount.

Further, the changes in Ip, Is and the difference Is–Ip thereof in a case in which noise of the same strength was detected at the photo-detectors 18s, 18p at the time the scale moved one period, were investigated by computer experimentation. The results thereof are shown in FIG. 9. As shown in FIG. 9, the difference Is–Ip is an ideal signal waveform from which the noise which can be seen in Ip, Is is completely removed. Further, the correlation between the amount of movement computed on the basis of the difference Is–Ip and the actual amount of movement, and the correlation between the amount of movement computed on the basis of the value of the intensity Ip and the actual amount of movement are shown in FIG. 10. From FIG. 10, it can be understood that, when the amount of movement is computed on the basis of the value of the intensity Ip, the error is large when the amount of movement is small, but when computation is carried out on the basis of the difference Is–Ip, the amount of movement can be measured extremely accurately.

[Effects of Noise Removal when the Output Light Intensity of the Light Source Fluctuates]

In the optical encoder shown in FIG. 6, an ND filter, which could randomly change the light intensity, was placed on the light path between the laser light source 12 and the polarizing beam splitter 40, and the laser light intensity was varied randomly by the ND filter at the time the scale moved. This state is the same as a state in which only the laser light intensity of the source of light emission varies and the polarization state does not vary, and noise in a case in which the output light intensity of the light source fluctuates is intentionally created. In the same way as described above, the linearly polarized light emitted from the laser light source 12 is P-polarized light, and the polarization states of the laser lights detected at the photo-detectors 18s, 18p is S-polarized light (intensity Is) and P-polarized light (intensity Ip), respectively.

Figure 11:
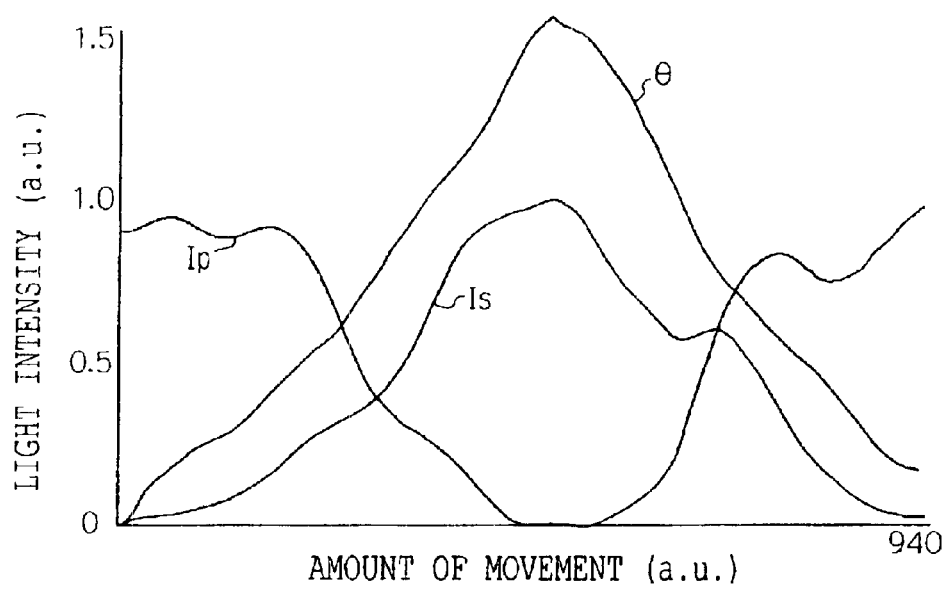
FIG. 11 is a graph showing changes in intensities Ip, Is and changes in the polarization angle θ, with respect to a scale movement amount when noise factors exist.

FIG. 11 shows the relationship between the amount of movement of the scale in one period of the signal waveform detected at the photo-detector, and each of the light intensities Is, Ip and the polarization θ. As can be understood from FIG. 11, although distortion arises in the intensities Is, Ip due to noise, this distortion is greatly reduced in the polarization θ.

Figure 12:
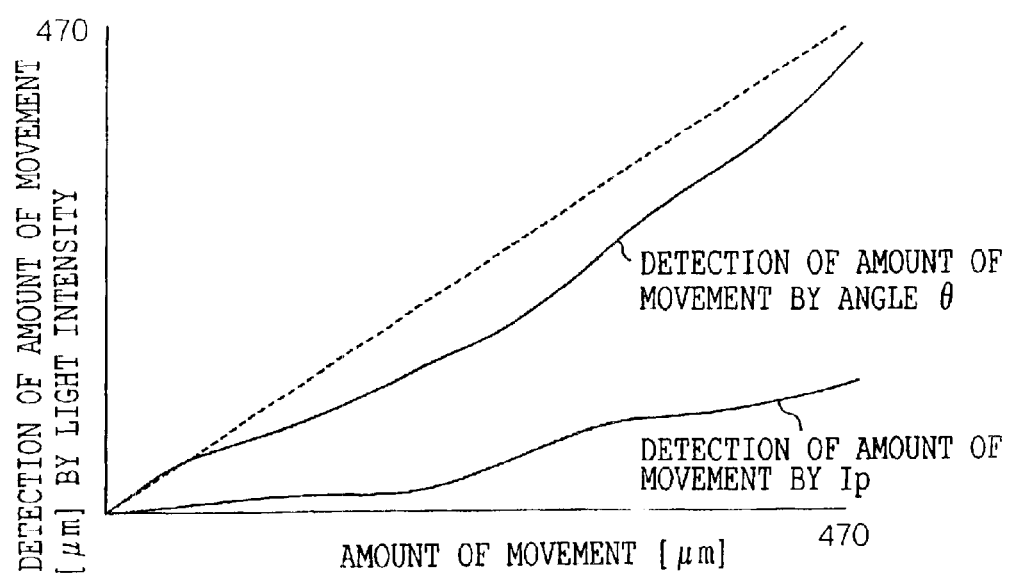
FIG. 12 is a graph showing a movement amount computed on the basis of the polarization angle θ, a movement amount computed on the basis of the value of the intensity Ip, and the correlation with the actual movement amount.

FIG. 12 shows the correlation between the amount of movement computed on the basis of the polarization θ and the actual amount of movement, and the correlation between the amount of movement computed on the basis of the intensity Ip and the actual amount of movement. As can be understood from FIG. 12, determining the amount of movement from the polarization θ results in more accurate detection of the amount of movement. Accordingly, by using two detection signals (the signals corresponding to the intensity Ip and the intensity Is), noise can be removed and measurement of a highly accurate amount of movement is possible.

[Effects of Noise Removal when External Light Penetrates]

In the optical encoder shown in FIG. 6, exposure devices, which output incoherent light, were disposed at the upstream sides of the photo-detectors 18s, 18p, and incoherent light penetrated randomly into the photo-detectors 18s, 18p at the time when the scale moved. Namely, a situation in which the measurement of the amount of movement of the scale was affected by external light noise was intentionally created. In the same way as described above, the linearly polarized light emitted from the laser light source 12 is P-polarized light, and the polarization states of the laser lights detected at the photo-detectors 18s, 18p is S-polarized light (intensity Is) and P-polarized light (intensity Ip), respectively.

Figure 13:
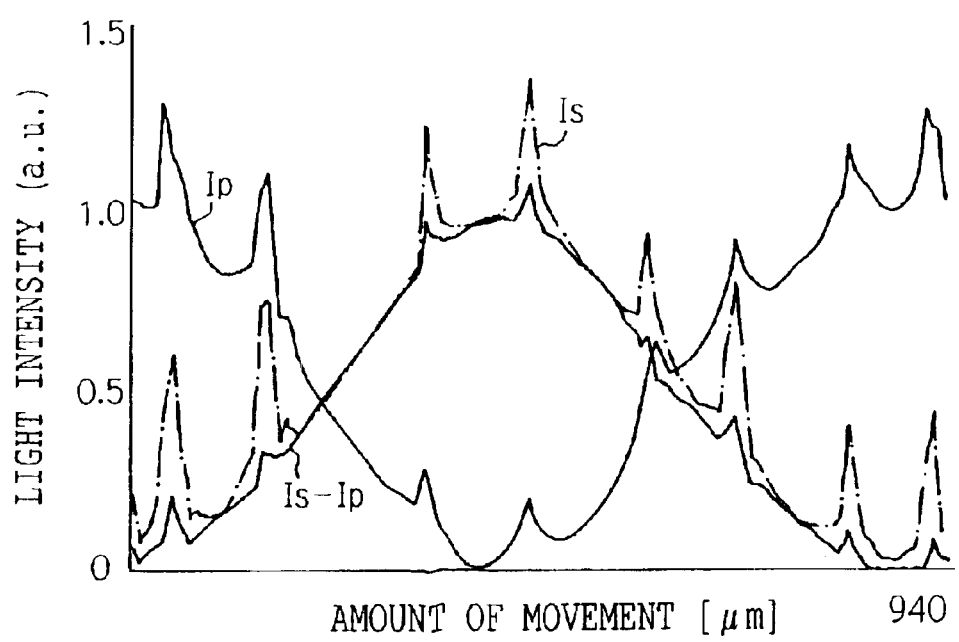
FIG. 13 is a graph showing changes in intensities Ip, Is and changes in the difference Is–Ip, with respect to a scale movement amount when noise factors exist.

FIG. 13 shows the relationship between the amount of movement of the scale in one period of the signal waveform detected at the photo-detector, and each of the intensities Is, Ip and their difference Is–Ip. As can be understood from FIG. 13, although distortion arises in the intensities Is, Ip due to noise, this distortion is greatly reduced in the difference Is–Ip.

Figure 14:
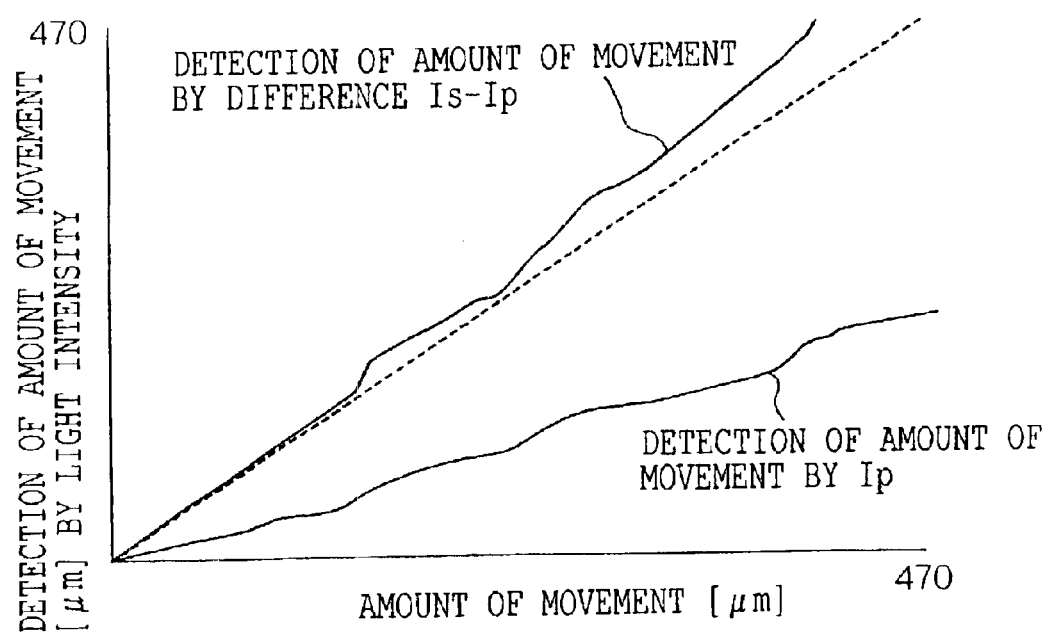
FIG. 14 is a graph showing a movement amount computed on the basis of the difference Is–Ip, a movement amount computed on the basis of the value of the intensity Ip, and the correlation with the actual movement amount.

FIG. 14 shows the correlation between the amount of movement computed on the basis of the difference Is–Ip and the actual amount of movement, and the correlation between the amount of movement computed on the basis of the intensity Ip and the actual amount of movement. As can be understood from FIG. 14, determining the amount of movement from the difference Is–Ip results in more accurate detection of the amount of movement. Accordingly, by using two detection signals (the signals corresponding to the intensity Ip and the intensity Is), noise can be removed and measurement of a highly accurate amount of movement is possible.

As described above, in the optical encoder relating to the present embodiment, it is possible to obtain the same effects as in the first embodiment, and in addition, it is possible to obtain a periodic signal from which noise factors have been removed by determining the polarization angle of the light transmitted through the scale, or determining the difference between the intensity Is of the S-polarized light component and the intensity Ip of the P-polarized light component of the light transmitted through the scale, or the like. Therefore, an even more highly accurate amount of movement can be detected on the basis of the signals.

[Other Polarized Light Separating Methods]

In the above description, the laser light transmitted through the scale is divided into an S-polarized light component and a P-polarized light component by the polarizing beam splitter, and is detected. However, the S-polarized light and the P-polarized light can be detected separately by using two analyzers whose orientations of the optic axes (transmission axes) are orthogonal to one another. A structural example of an optical encoder in this case is shown in FIGS. 15A and 15B.

Figure 15A:
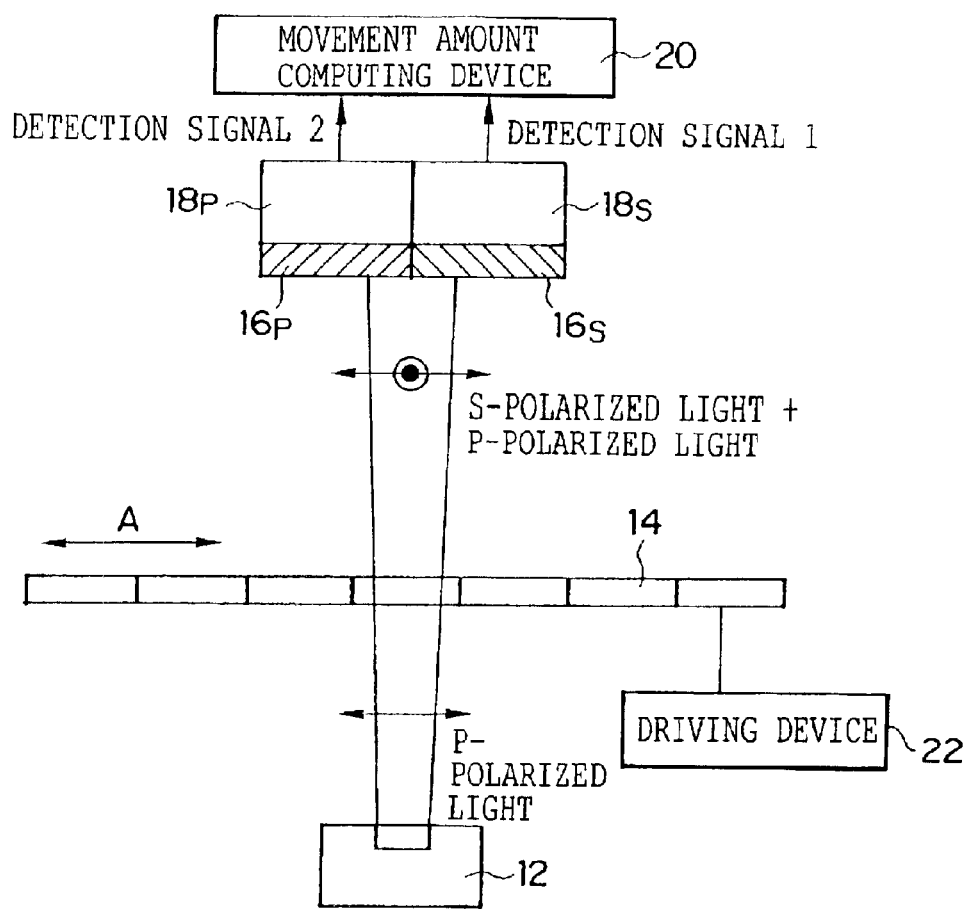
FIG. 15A is a schematic diagram showing the structure of a variant example of the optical encoder relating to the second embodiment.
Figure 15B:
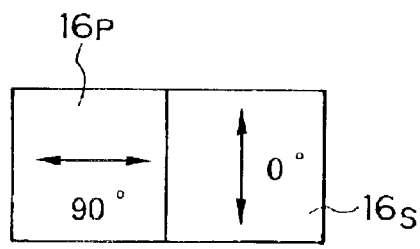
FIG. 15B is a diagram showing the orientations of the transmission axes of analyzers used in the optical encoder of FIG. 15A.

As shown in FIGS. 15A and 15B, an analyzer 16s, whose orientation of the optic axis is 0°, and an analyzer 16p, whose orientation of the optic axis is 90°, are disposed adjacent to one another at the light exiting side of the transmission-type scale 14, such that the laser light which has been transmitted through the scale 14 is irradiated substantially uniformly onto both. The photo-detector 18s is disposed at the light exiting side of the analyzer 16s, and the photo-detector 18p is disposed at the light exiting side of the analyzer 16p.

In this structure, the S-polarized light is transmitted through the analyzer 16s, and the intensity thereof is detected at the photo-detector 18s. Further, the P-polarized light is transmitted through the analyzer 16p, and the intensity thereof is detected at the photo-detector 18p. Namely, the light intensities of the S-polarized light and the P-polarized light are detected separately.

(Third Embodiment)

[Structure of Optical Encoder]

Figure 16A:
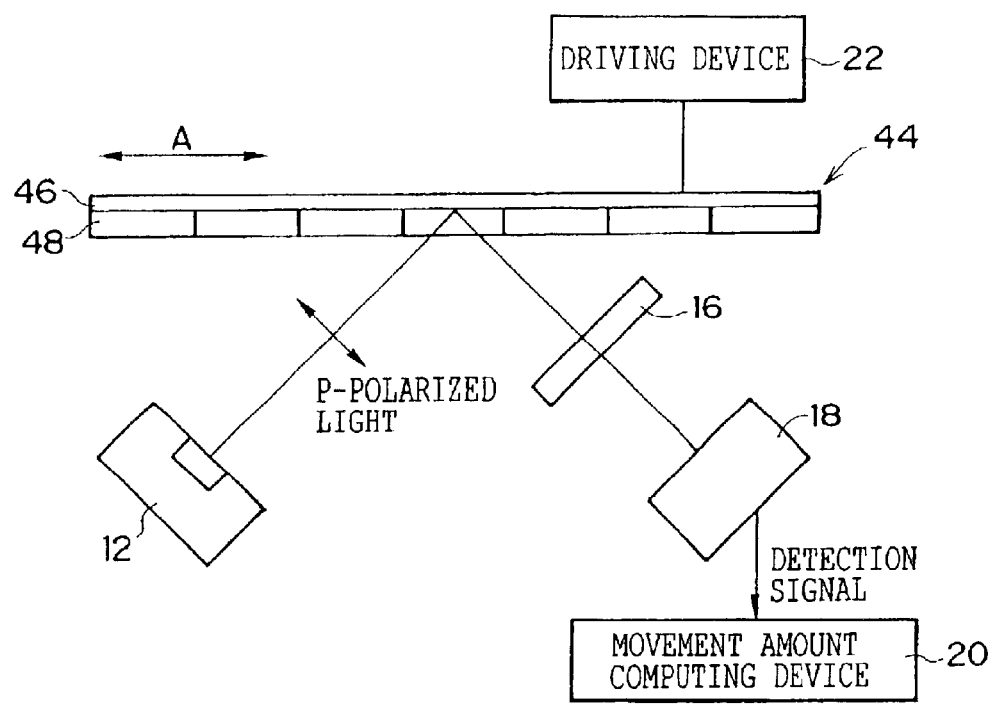
FIG. 16A is a schematic diagram showing the structure of an optical encoder relating to a third embodiment.

An optical encoder relating to the third embodiment has the same structure as that of the optical encoder relating to the first embodiment, except that, as shown in FIG. 16A, a reflection-type scale is used, and the analyzer and the photo-detector are disposed at the light reflecting side of the reflection-type scale. Thus, portions which are the same are denoted by the same reference numerals, and description thereof is omitted.

In this optical encoder, a reflection-type scale 44, which is elongated and which is equipped with a plurality of quarter-wave plates which rotate the polarization direction (plane of polarization) of the laser light, is disposed at the light exiting side of the laser light source 12. The analyzer 16, which selectively transmits linearly polarized light of a predetermined polarization direction, and the photo-detector 18, which detects the intensity of the laser light transmitted through the analyzer 16, are disposed in that order on the light path of the light reflected by the reflection-type scale 44. The reflection-type scale 44 is disposed so as to be inclined at a predetermined angle with respect to the light exiting direction of the laser light source 12 so that the light is reflected in a different direction from the direction of incidence of the incident light. The reflection-type scale 44 is structured so as to be movable in the directions of arrow A, which runs along the longitudinal direction of the scale, via an unillustrated driving mechanism controlled by the driving device 22. Further, the photo-detector 18 is connected to the movement amount computing device 20 which computes the amount of movement on the basis of the detection signal of the photo-detector 18.

Figure 16B:
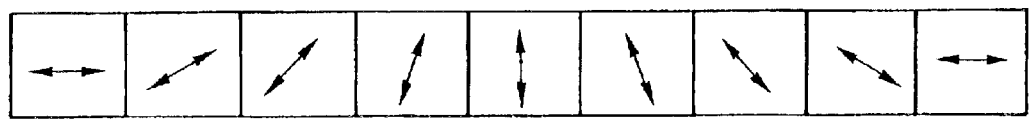
FIG. 16B is a diagram showing the orientations of quarter-wave plates arrayed in a reflection-type scale used in the optical encoder of FIG. 16A.

As shown in FIG. 16B, the reflection-type scale 44 is structured by a plurality of quarter-wave plates having different orientations being arrayed along the longitudinal direction, such that the orientations of the quarter-wave plates vary periodically along the longitudinal direction of the scale. At the scale, nine quarter-wave plates per one period are arrayed such that the orientations of the quarter-wave plates rotate continuously along the longitudinal direction counterclockwise by 22.5° each. Note that, FIG. 16B illustrates an array of quarter-wave plates of one period. However, quarter-wave plates of a plurality of periods may be arrayed at the scale. As will be described later, in the case of the reflection-type scale, the laser light which is incident on the scale is transmitted through the quarter-wave plate twice due to reflection. Thus, the quarter-wave plate ends up functioning as a half-wave plate.

The reflection-type scale 44 can be fabricated by utilizing the recording medium shown in FIG. 3B, in which a recording layer 48, which exhibits photo-induced anisotropy and at which the induced anisotropy can be recorded and held, is formed on one surface of a reflective member 46 of metal plate or the like, and by recording the photo-induced anisotropy such that quarter-wave plates are formed on the recording layer 48 of this recording medium. In the same way as the transmission-type scale, an azopolymer is suitable as the recording material forming the recording layer 48. Further, photo-induced anisotropy can be recorded on the recording layer 48 formed by an azopolymer, by the same method as in the case of the transmission-type scale.

In order to induce the function of a quarter-wave plate at this time, the photo-induced birefringence Δn must be a value satisfying the following formula. Here, d is the thickness of the recording layer (azopolymer layer), and λ is the wavelength of the probe light.

$$\Delta n \cdot d = \frac{(m+1)\lambda}{4} \text{(wherein } m \text{ is 0 or a positive integer)}$$

As can be understood from the above formula, the function of a quarter-wave plate can be induced in the recording layer by, for example, making the thickness d of the recording layer in half and making the other conditions the same as in the case of fabricating the transmission-type scale. Note that, as described above, in the case of the reflection-type scale, the quarter-wave plate ultimately functions as a half-wave plate.

[Operation of Optical Encoder]

Next, operation of the optical encoder shown in FIG. 16A will be described. The laser light, which is output from the laser light source 12 as linearly polarized light having a predetermined polarization direction, is irradiated onto the reflection-type scale 44 disposed at the light exiting side of the laser light source 12. The laser light, which is incident from the recording layer 48 side of the reflection-type scale 44, is transmitted through the recording layer 48, is reflected at the surface of the reflecting member 46, is again transmitted through the recording layer 48, and exits therefrom. The polarization direction of the laser light incident on the reflection-type scale 44 is rotated a predetermined angle in accordance with the orientation of the quarter-wave plate formed at the irradiated portion. When the reflection-type scale 44 is moved in the direction of arrow A via the unillustrated driving mechanism by the driving device 22, in the same way as in the case of using the transmission-type scale, the polarization angle of the reflected light varies periodically in accordance with the variation in the orientations of the quarter-wave plates arrayed in the longitudinal direction.

Then, among the laser light reflected at the reflection-type scale 44, only the polarized light component of a predetermined polarization direction (e.g., the P-polarized light component) is transmitted through the analyzer 16, and the intensity thereof is detected at the photo-detector 18. The light intensity of the polarized light component transmitted through the analyzer 16 varies in accordance with the polarization angle of the laser light reflected at the scale. Thus, the detected light intensity varies periodically as the reflection-type scale 44 moves, and a sinusoidal detection signal is output to the movement amount computing device 20. When the reflection-type scale 44 moves one period, a signal of two periods is detected. The movement amount computing device 20 computes the movement amount on the basis of the detection signal.

As described above, in the optical encoder relating to the present embodiment, the polarization angle of the reflected light varies periodically due to the movement of the scale, and the light intensity detected at the photo-detector varies in accordance with the polarization angle. Thus, it is difficult for the amount of change in the detected light intensity to be affected by fluctuations in the output light intensity of the laser light source and fluctuations caused by noise factors such as external light and the like, and an exact amount of movement can be detected. In this way, there is no need for highly precise alignment or an appropriate light-shielded environment, and the optical encoder can be utilized for various applications and in various environments, and can be made more compact.

Further, because a surface-emitting laser, which can keep the spreading of the beam relatively low, is used as the light source, there is no need for a collimator lens or a condensing lens. Thus, the device can be made more compact and less expensive.

Moreover, in a conventional optical encoder which detects the amount of movement by varying the laser light intensity due to movement of the scale, when the scale moves one period, only a signal of one period is detected. However, in the present embodiment, because a signal of two periods is detected when the scale moves one period, high resolution can be realized.

(Fourth Embodiment)

[Structure of Optical Encoder]

Figure 17:
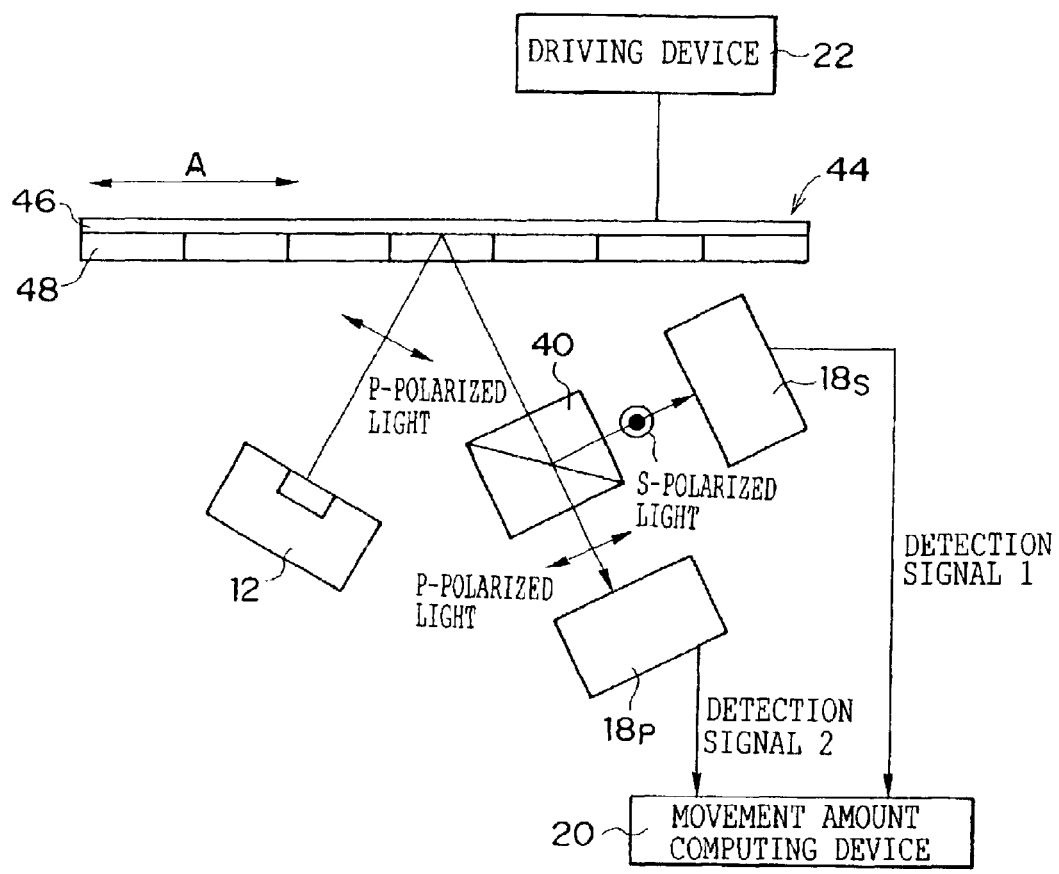
FIG. 17 is a schematic diagram showing the structure of an optical encoder relating to a fourth embodiment.

As shown in FIG. 17, an optical encoder relating to the fourth embodiment has the same structure as that of the optical encoder relating to the second embodiment and shown in FIG. 6, except that a reflection-type scale is used, and the polarizing beam splitter and the photo-detectors are disposed at the light exiting side of the reflection-type scale. Thus, portions which are the same are denoted by the same reference numerals, and description thereof is omitted.

[Operation of Optical Encoder]

Next, operation of the optical encoder shown in FIG. 17 will be described. The laser light, which is output from the laser light source 12 as linearly polarized light having a predetermined polarization direction, is irradiated onto the reflection-type scale 44 disposed at the light exiting side of the laser light source 12, and the polarization direction of the incident laser light is rotated by a predetermined angle in accordance with the orientation of the quarter-wave plate formed at the irradiated portion. When the reflection-type scale 44 is moved in the direction of arrow A via the unillustrated driving mechanism by the driving device 22, the polarization angle of the reflected light varies periodically in accordance with the change in the orientations of the quarter-wave plates which are arrayed in the longitudinal direction.

Then, the laser light which is reflected by the reflection-type scale 44 is separated into an S-polarized light component and a P-polarized light component by the polarizing beam splitter 40. The intensity Is of the S-polarized light component is detected at the photo-detector 18s, and the intensity Ip of the P-polarized light component is detected at the photo-detector 18p. The light intensity of a polarized light component of a predetermined polarization direction varies in accordance with the polarization angle. Therefore, each of the light intensities Is, Ip varies periodically as the reflection-type scale 44 moves. The detection signal 1 of the intensity Is is output to the movement amount computing device 20 from the photo-detector 18s, and the detection signal 2 of the intensity Ip is output to the movement amount computing device 20 from the photo-detector 18p. When the reflection-type scale 44 moves one period, a signal of two periods is detected for each of the light intensities Is, Ip.

The movement amount computing device 20 computes the amount of movement on the basis of the detection signal 1 and the detection signal 2. First, a third signal, from which noise has been removed, is obtained by using detection signal 1 and detection signal 2. In the same way as in the second embodiment, the third signal, from which noise has been removed, can be obtained by using a method of determining the polarization θ (substitute the term "reflected light" for "transmitted light" in the above description of this method), a method of determining the difference between the intensity Is of the S-polarized light and the intensity Ip of the P-polarized light, or the like. Thereafter, in the same way as in the second embodiment, the amount of movement of the scale can be computed on the basis of the third signal.

Figure 18A:
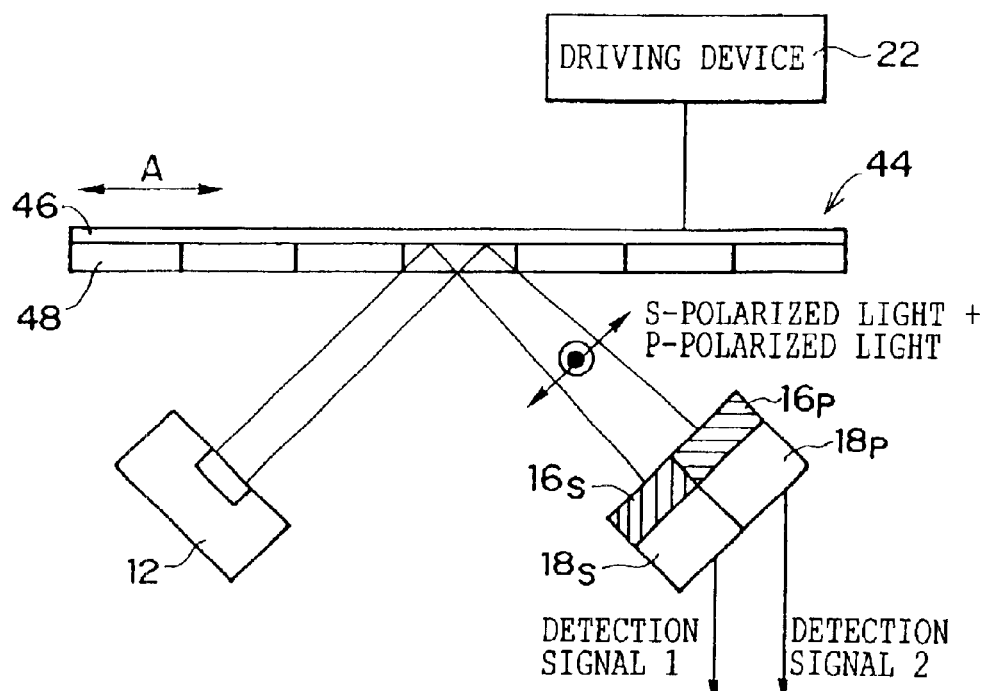
FIG. 18A is a schematic diagram showing the structure of a variant example of the optical encoder relating to the fourth embodiment.
Figure 18B:
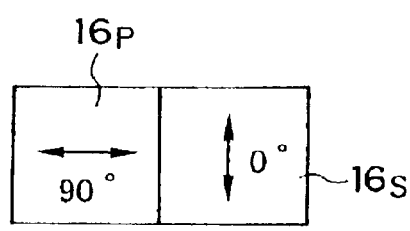
FIG. 18B is a diagram showing the orientations of transmission axes of analyzers used in the optical encoder of FIG. 18A.

Further, as shown in FIGS. 18A and 18B, the analyzer 16s and the analyzer 16p, whose orientations of the transmission axes are orthogonal to one another, may be disposed at the light exiting side of the reflection-type scale 44, and the S-polarized light and the P-polarized light may be detected individually from the laser light reflected at the reflection-type scale 44.

As described above, in the optical encoder relating to the present embodiment, the same effects as those of the third embodiment are achieved, and in addition, it is possible to obtain a periodic signal from which noise factors have been removed by determining the polarization angle of the light reflected by the scale, or by determining the difference between the intensity Is of the S-polarized light component and the intensity Ip of the P-polarized light component of the light reflected by the scale, or the like. Therefore, the amount of movement can be detected even more highly precisely on the basis of the signal.

(Fifth Embodiment)

An optical encoder relating to the fifth embodiment is an optical encoder in which a transmission-type scale having a different array of half-wave plates is applied to the structure of the optical encoder relating to the first embodiment and shown in FIG. 1.

Figure 19A:
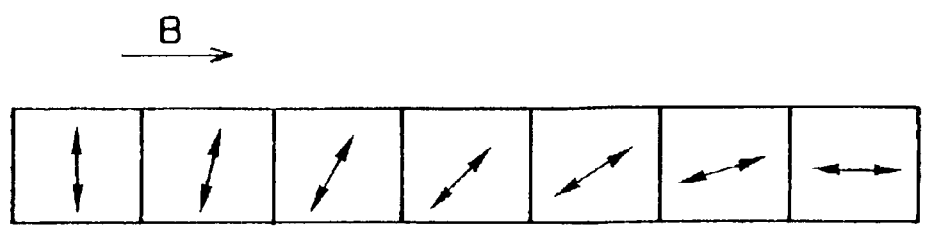
FIG. 19A is a diagram showing the orientations of half-wave plates arrayed in a transmission-type scale used in an optical encoder relating to a fifth embodiment.

As shown in FIG. 19A, in this transmission-type scale, seven half-wave plates are arrayed per period such that the orientations of the half-wave plates are rotated clockwise by 15° each along the longitudinal direction. Note that, although half-wave plates of one period are arrayed in FIG. 19A, half-wave plates of plural periods are arrayed at the scale. In this scale, the orientations of the half-wave plates do not rotate continuously, but rotate by 90° at the time of moving on to the next period.

Figure 19B:
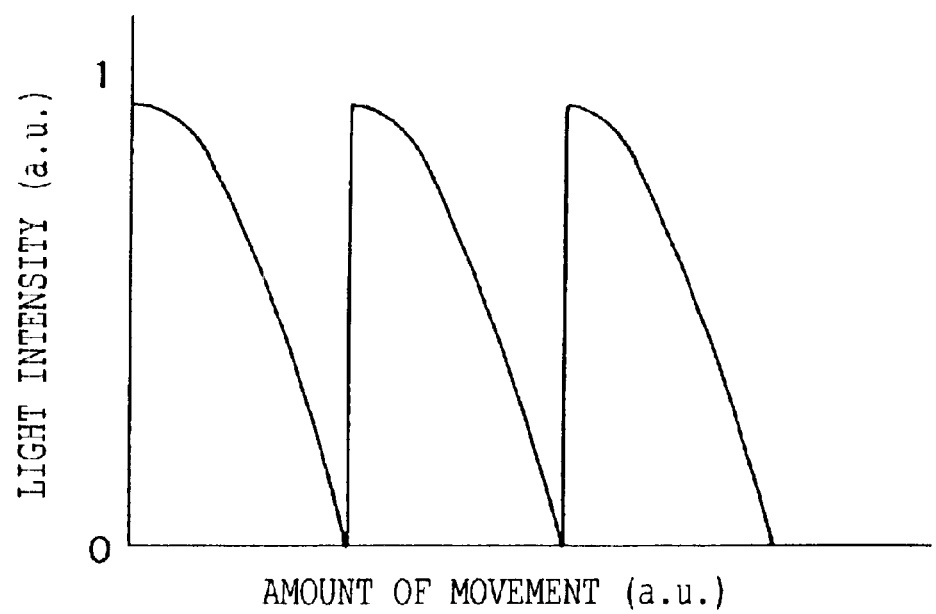
FIG. 19B is a graph showing changes in light intensity with respect to a scale movement amount in a case in which the scale shown in FIG. 19A is used.

Using this transmission-type scale, when laser light is irradiated such that the laser light moves relatively to the scale in the direction of arrow B, the light intensity detected at the photo-detector 18 after transmission through the analyzer 16 varies in a sawtooth waveform as the transmission-type scale 14 moves, as shown in FIG. 19B. On the other hand, when laser light is irradiated such that the laser light moves relatively to the scale in the direction opposite the direction of arrow B, a different signal waveform is detected. Accordingly, the directions of movement of the scale can be differentiated by using this difference in the signal waveforms.

As described above, the optical encoder of the present embodiment achieves the same effects as the optical encoder relating to the first embodiment, and in addition, has the effect that the amount of movement of the scale and the direction of movement of the scale can be known by detecting the amount of change in the light intensity accompanying the movement of the scale.

Further, a reflection-type scale can be fabricated by similarly arraying a plurality of quarter-wave plates. For example, by using this reflection-type scale in the optical encoder relating to the third embodiment or the like, the same effects can be achieved.

(Sixth Embodiment)

Figure 20:
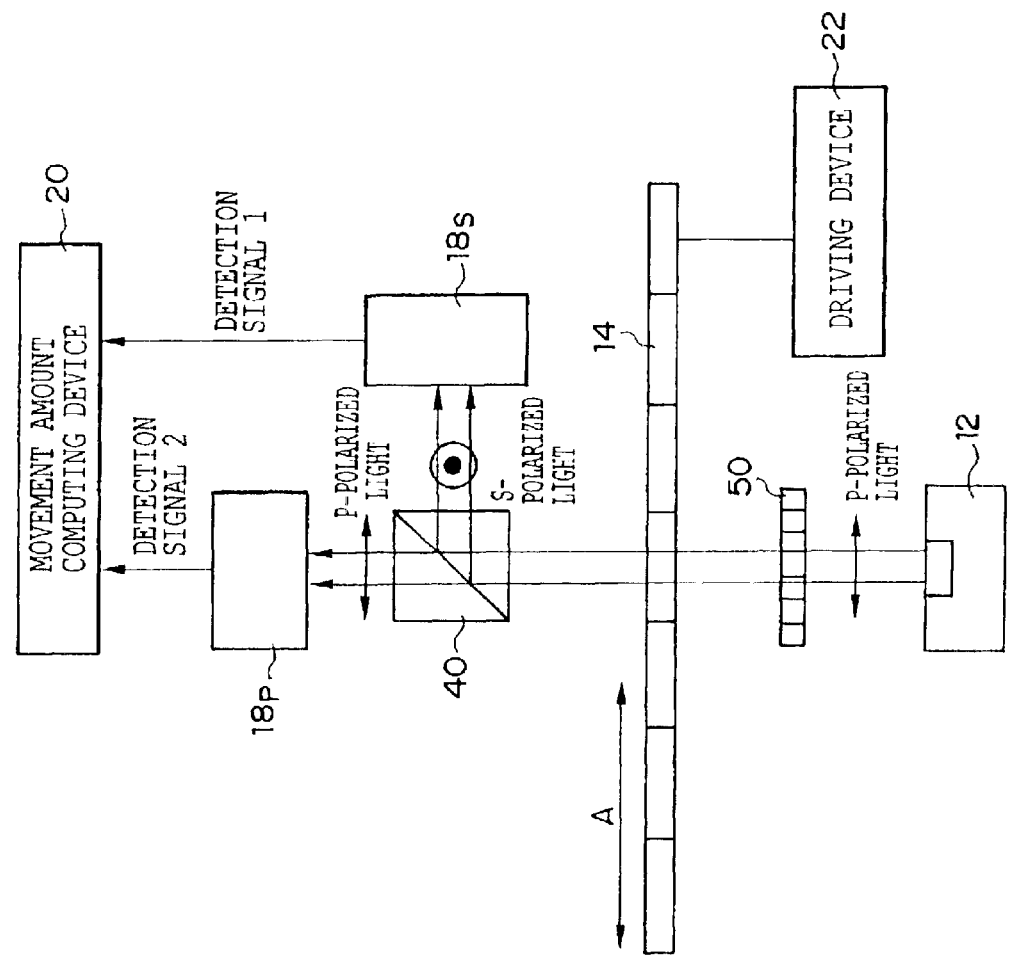
FIG. 20 is a schematic diagram showing the structure of an optical encoder relating to a sixth embodiment.

As shown in FIG. 20, an optical encoder relating to the sixth embodiment has the same structure as that of the optical encoder relating to the second embodiment and shown in FIG. 6, except for the fact that a polarization modulating element is disposed between the laser light source and the transmission-type scale. Thus, the same portions are denoted by the same reference numerals, and description thereof is omitted.

In this optical encoder, a polarization modulating element 50, which is elongated and is equipped with a plurality of half-wave plates which rotate the polarization direction of the laser light, is disposed so as to be fixed between the laser light source 12 and the transmission-type scale 14, such that the longitudinal direction of the polarization modulating element 50 substantially coincides with the direction of movement of the scale (the directions of arrow A). In the same way as the transmission-type scale 14, the polarization modulating element 50 is structured such that a plurality of half-wave plates having different orientations are arrayed along the longitudinal direction such that the orientations of the half-wave plates vary periodically along the longitudinal direction of the scale as shown in FIG. 2A. Note that, although an array of half-wave plates of one period is shown in FIG. 2A, half-wave plates of a plurality of periods are arrayed at the scale. At the scale, nine half-wave plates are arrayed per period, such that the orientations of the half-wave plates rotate continuously along the longitudinal direction counterclockwise by 22.5° each.

The laser light, which is output from the laser light source 12 as linearly polarized light having a predetermined polarization direction, is incident on the polarization modulating element 50, and the polarization direction is rotated by a predetermined angle in accordance with the orientations of the half-wave plates formed at the irradiated portion. Because a plurality of half-wave plates are formed at the irradiated portion of the laser light, laser light having a polarization distribution (a plurality of polarization states) exits from the polarization modulating element 50 and is irradiated onto the transmission-type scale 14. Then, as the transmission-type scale 14 moves in the direction of arrow A, the polarization angle of the transmitted light varies periodically in accordance with the change in the orientations of the half-wave plates arrayed in the longitudinal direction of the scale.

By making the variation period Λ' of the orientations of the half-wave plates of the polarization modulating element 50 the same as a variation period Λ of the orientations of the half-wave plates of the transmission-type scale 14, and by making a beam diameter d of the laser light irradiated onto the scale satisfy the following formula, the detected light intensity is a maximum, and the S/Ns of the signals detected at the photo-detectors 18s, 18p improve. Accordingly, in addition to the fact that the same effects as those of the optical encoder relating to the second embodiment can be achieved, it is possible to detect the amount of movement with even higher accuracy by improving the SINs of the detection signals.

$$d = \frac{(2n+1)\Lambda}{4} \text{ (wherein } n \text{ is an integer)}$$

(Seventh Embodiment)

Figure 21:
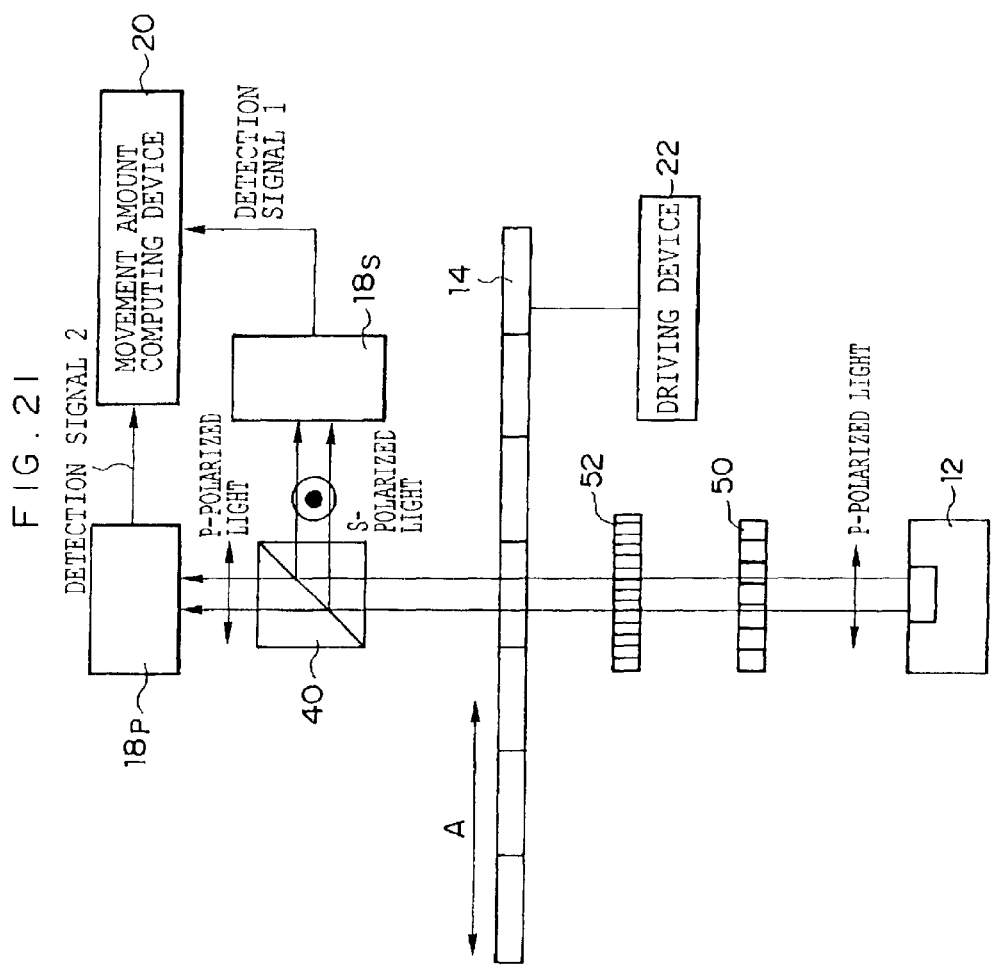
FIG. 21 is a schematic diagram showing the structure of an optical encoder relating to a seventh embodiment.

As shown in FIG. 21, an optical encoder relating to the seventh embodiment has the same structure as that of the optical encoder relating to the sixth embodiment and shown in FIG. 20, other than the fact that a polarizing element is disposed between the transmission-type scale and the polarization modulating element. Thus, the same portions are denoted by the same reference numerals, and description thereof is omitted.

In this optical encoder, a polarizing element 52, which selectively transmits linearly polarized light of a predetermined polarization direction, is disposed between the polarization modulating element 50 and the transmission-type scale 14. The laser light, which is output from the laser light source 12 as linearly polarized light having a predetermined polarization direction, is incident on the polarization modulating element 50, and the polarization direction is rotated by a predetermined angle in accordance with the orientations of the half-wave plates formed at the incident portion. Because a plurality of half-wave plates are formed at the portion at which the laser light is incident, laser light having a polarization distribution exits from the polarization modulating element 50. Among the laser light exiting from the polarization modulating element 50, only the polarized light component of a predetermined polarization direction (e.g., the S-polarized light component) is transmitted through the polarizing element 52, and is irradiated onto the transmission-type scale 14. Namely, the laser light exiting from the light source at a predetermined beam diameter is made into a bundle of laser light having an even smaller beam diameter, and is irradiated onto the transmission-type scale 14. Then, as the transmission-type scale 14 moves in the direction of arrow A, the polarization angle of the transmitted light varies periodically in accordance with the changes in the orientations of the half-wave plates arrayed in the longitudinal direction of the scale.

By making the variation period $\Lambda'$ of the orientations of the half-wave plates of the polarization modulating element 50 be twice the variation period $\Lambda$ of the orientations of the half-wave plates of the transmission-type scale 14, and by making the beam diameter d of the laser light irradiated onto the scale satisfy the same formula as in the sixth embodiment, the detected light intensity is a maximum, and the S/Ns of the signals detected at the photo-detectors 18s, 18p improve. Accordingly, in addition to the fact that the same effects as those of the optical encoder relating to the second embodiment can be achieved, it is possible to detect the amount of movement with even higher accuracy by improving the S/Ns of the detection signals.

(Eighth Embodiment)

Figure 22:
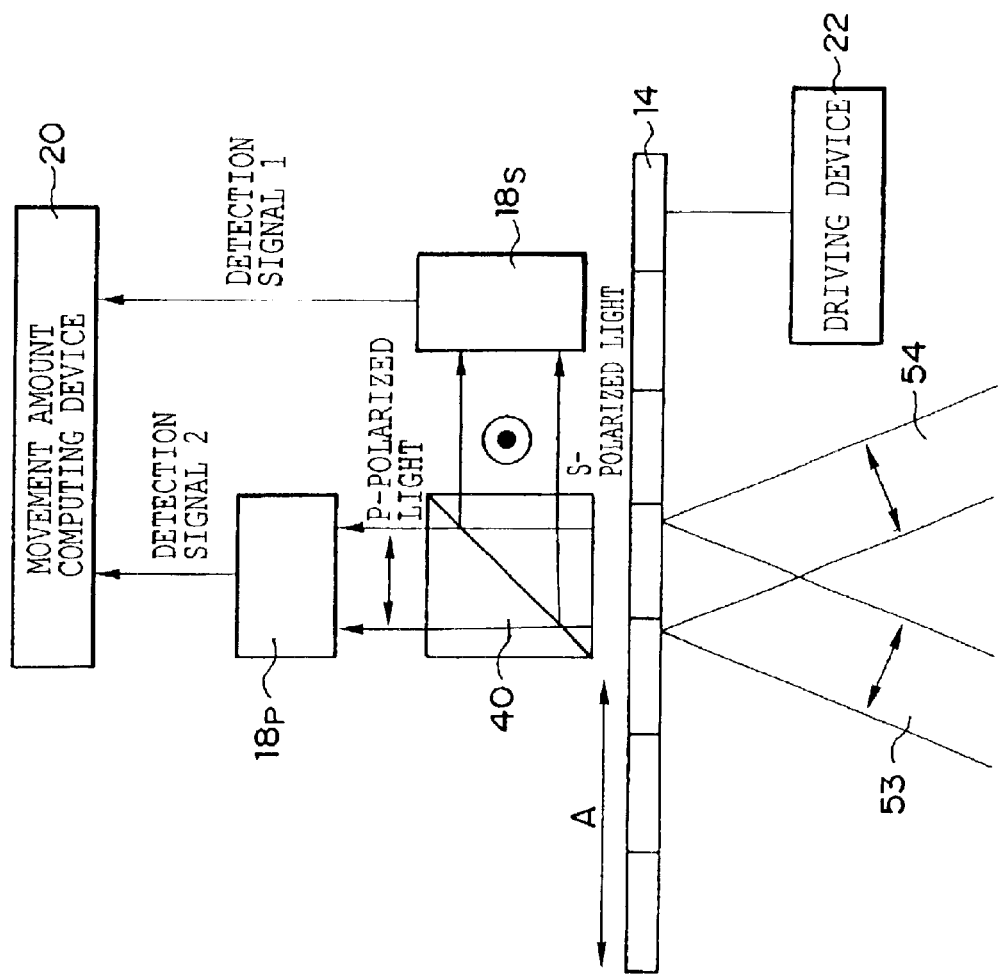
FIG. 22 is a schematic diagram showing the structure of an optical encoder relating to an eighth embodiment.

As shown in FIG. 22, an optical encoder relating to the eighth embodiment has the same structure as that of the optical encoder relating to the second embodiment and shown in FIG. 6, except that a plurality of laser lights interfere with one another, and the obtained interference light is irradiated onto the transmission-type scale. Thus, the same portions are denoted by the same reference numerals, and description thereof is omitted.

This optical encoder is equipped with a laser light source (not shown) which outputs linearly polarized light of a predetermined polarization direction. The laser light emitted from the laser light source is divided into two light waves which are laser light 53 and laser light 54, by a separating optical element such as a beam splitter or the like. The laser light 53 and the laser light 54 intersect one another due to an unillustrated optical system.

When the laser light 53 and the laser light 54 intersect one another, the two light waves interfere with one another, and the interference light is irradiated onto the same portion of the transmission-type scale 14. At the surface of the transmission-type scale 14, interference fringes having a sharp intensity distribution are formed, and effects which are the same as when a plurality of laser lights of small beam diameters are irradiated in parallel can be obtained.

In this way, by making the beam diameter of the irradiated laser light small, the amount of irradiated light which is not needed for movement amount detection can be reduced, and a signal having a large S/N can be detected. Accordingly, the same effects as those of the optical encoder relating to the second embodiment can be obtained, and in addition, it is possible to detect the amount of movement with even higher accuracy by improving the S/N of the detection signal. In order to improve the S/N of the detection signal, it is preferable to make the pitch of the interference fringes be an integer multiple of a half-period of the scale.

Note that, in the above description, the interference fringes are formed by making the two light waves intersect. However, interference fringes may be formed by making three or more light waves intersect.

(Ninth Embodiment)

Figure 23:
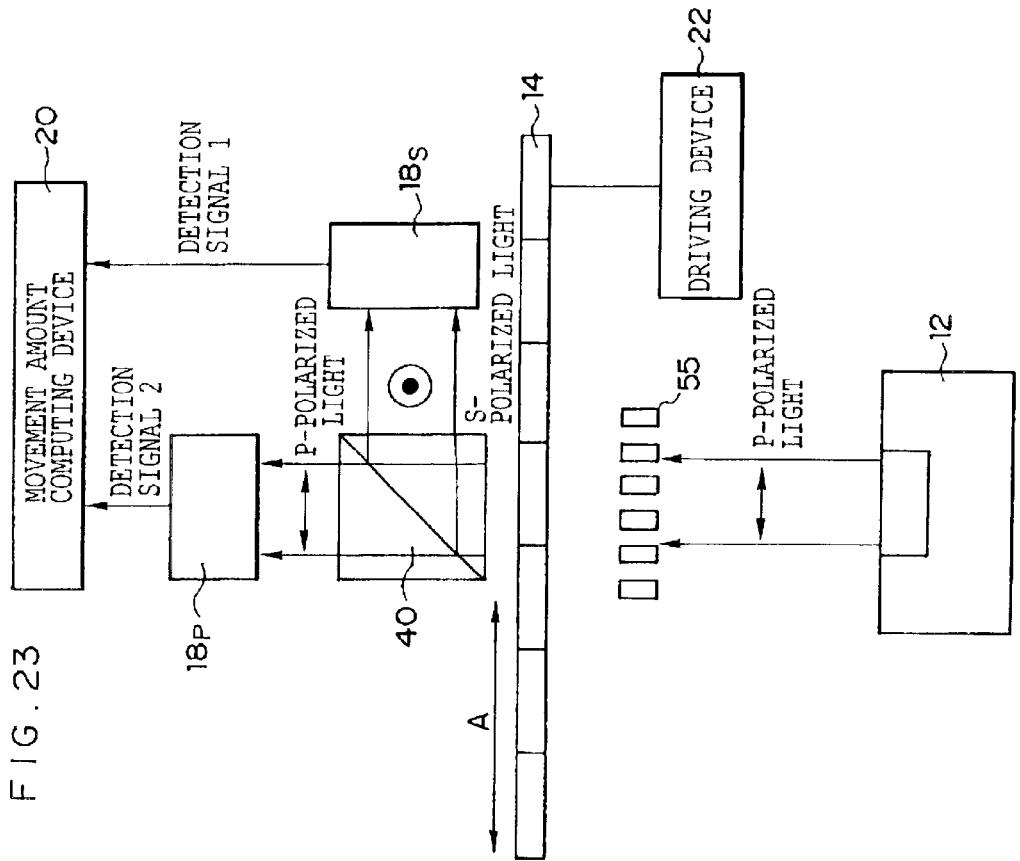
FIG. 23 is a schematic diagram showing the structure of an optical encoder relating to a ninth embodiment.

As shown in FIG. 23, an optical encoder relating to the ninth embodiment has the same structure as that of the optical encoder relating to the second embodiment and shown in FIG. 6, other than the fact that laser lights which are diffracted at a diffraction grating interfere with one another and the obtained interference light (multiple interference light) is irradiated onto the transmission-type scale. Thus, the same portions are denoted by the same reference numerals, and description thereof is omitted.

In this optical encoder, a transmission-type diffraction grating 55 is disposed between the laser light source 12 and the transmission-type scale 14. The laser light, which is output from the laser light source 12 as linearly polarized light having a predetermined polarization direction, is diffracted in a predetermined direction by the diffraction grating 55. The diffracted lights which are transmitted through the diffraction grating 55 multiple-interfere with one another, and the interference light is irradiated onto the transmission-type scale 14. At the surface of the transmission-type scale 14, interference fringes having a sharp intensity distribution are formed, and effects which are the same as when a plurality of laser lights of small beam diameters are irradiated in parallel can be obtained.

In this way, by making the beam diameter of the irradiated laser light small, the amount of irradiated light which is not needed for movement amount detection can be reduced, and a signal having a large S/N can be detected. Accordingly, the same effects as those of the optical encoder relating to the second embodiment can be obtained, and in addition, it is possible to detect the amount of movement with even higher accuracy by improving the S/N of the detection signal. In order to improve the S/N of the detection signal, it is preferable to make the pitch of the interference fringes be an integer multiple of a half-period of the scale.

Hereinafter, suitable embodiments and other embodiments and the like of the present invention will be described.

In the optical encoders relating to the above-described first through ninth embodiments, it is preferable that a polarizer be disposed between the laser light source and the scale. When the polarization state of the light emitted from the laser light source fluctuates, the effects due to the fluctuations are reduced by the polarizer, and noise can be reduced. Further, it is preferable to dispose an aperture between the laser light source and the scale. The amplitude of the detection signal fluctuates in accordance with the beam diameter and the scale period. Thus, when the beam diameter of the laser light emitted from the light source fluctuates, laser light of a predetermined beam diameter is irradiated onto the scale by the aperture. Fluctuations in the amplitude of the detection signal are prevented, and noise can be reduced.

In the above-described first through ninth embodiments, description was given of examples in which laser light which is linearly polarized light is irradiated onto the scale. However, circularly polarized light or elliptically polarized light may be irradiated onto the scale. In this case, the light is converted into linearly polarized light by using a scale equipped with a quarter-wave plate.

In the above-described first through ninth embodiments, description was given of examples in which a surface-emitting laser is used as the laser light source. However, a general laser light source, which is used as the light source in conventional optical encoders, may be used.

In the above-described first through ninth embodiments, description was given of examples using scales equipped with half-wave plates and quarter-wave plates which rotate the polarization direction of the laser light. However, scales which can be utilized are not limited to the same, and any type of scale may be used provided that the change in the polarization state due to the scale can be detected as a variation in the light intensity. Here, the polarization state means the state of the polarization of the light expressed by the polarization direction and the shape (linearly polarized light, circularly polarized light, elliptically polarized light) of the change in the electric field as seen from the direction in which the light advances.

In the above-described first through ninth embodiments, description was given of examples utilizing scales in which a plurality of waveplates having different orientations are arrayed such that the orientations vary periodically. However, there is no need for the orientations to vary periodically, provided that the amount of movement of the scale can be determined uniformly on the basis of the amount of change in the polarization state due to the movement of the scale. Further, the plurality of waveplates having different orientations may be arrayed such that the orientations thereof vary continuously, or may be arrayed such that the orientations thereof vary non-continuously. Moreover, there are no particular limitations on the number of waveplates having different orientations (other than the fact that a plurality of waveplates must be provided). For example, the polarization state may modulated to two values by alternately arraying two types of waveplates having different orientations. Or, the polarization state may be modulated to a large number of values by arraying a large number of waveplates having different orientations.

In the above-described first through ninth embodiments, description was given of optical linear encoders using linear scales. However, the present invention is also applicable to rotary encoders which measure the amount of rotation of a scale by using a disc-shaped scale which rotates relative to a light source.

Moreover, in the above-described first through ninth embodiments, description was given of examples in which the scale moves in a predetermined direction by a driving device. However, it suffices for the scale to move relative to the laser light source; the scale may be fixed and the laser light source moved. In this case, the photo-detector and the like must be moved accompanying the movement of the laser light source, so that the laser light, which is polarized and modulated at the scale, can be detected at the photo-detector.

In the above-described first through ninth embodiments, description was given of examples in which a detecting optical system including the laser light source and the photo-detector is provided for one scale. However, a plurality of detecting optical systems may be provided for one scale.

In the above-described first through ninth embodiments, description was given of examples in which scales are fabricated by successively irradiating pump light of a different polarization direction per place onto a recording medium having an azopolymer layer, so as to modulate the orientations of the birefringence to multiple angles and record the birefringence. However, hereinafter, other methods of modulating the orientations of the birefringence to multiple angles and recording the birefringence on a recording medium equipped with an azopolymer layer will be described.

A first method is a method in which a lithography process technique by original image reduction exposure is applied to birefringence recording, and pump light having a different polarization direction per place is irradiated one time onto the recording medium so as to modulate the orientations of the birefringence to multiple angles and record the birefringence.

Figure 24A:
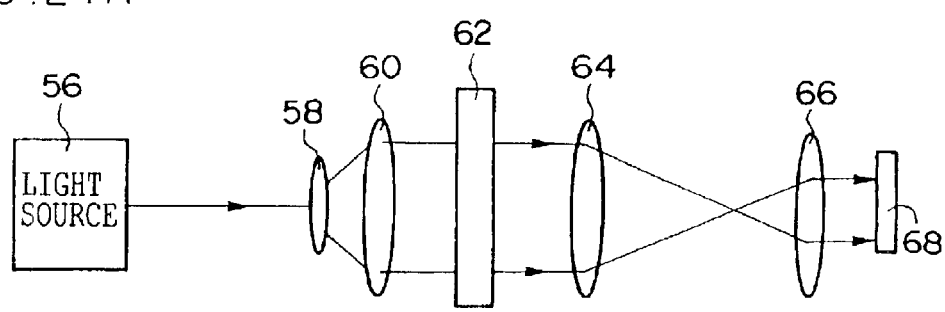
FIG. 24A is a cross-sectional view taken along an optical axis and showing the structure of an optical system for irradiating pump light having a plurality of polarization orientations.

FIG. 24A shows an optical system for irradiating pump light having plural polarization orientations. In this optical system, the laser light output from a laser light source 56 is made into parallel light expanded by collimator lenses 58, 60, and is made incident onto a spatial polarized light modulator 62. Because the spatial polarized light modulator 62 has the function of a half-wave plate which can arbitrarily rotate the polarization direction of the incident light per pixel, the polarized light is modulated by the spatial polarized light modulator 62.

Figure 24B:
FIG. 24B is a diagram showing orientations of half-wave plates arrayed in a spatial polarized light modulator of the optical system shown in FIG. 24A.
Figure 24C:
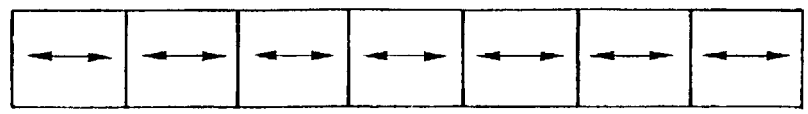
FIG. 24C is a diagram shown polarization directions of incident light.
Figure 24D:
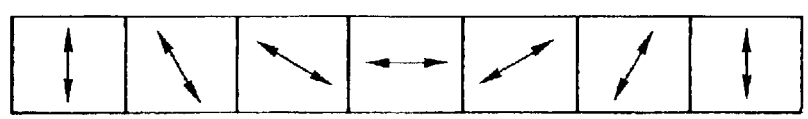
FIG. 24D is a diagram showing a polarization distribution of exiting pump light.

For example, when using a spatial polarized light modulator having a plurality of half-wave plates which can vary the principal axis orientations as shown in FIG. 24B, when linearly polarized light having the polarization directions shown in FIG. 24C is incident on the spatial polarized light modulator, the polarization directions of the linearly polarized light are rotated in accordance with the principal axis orientations of the respective half-wave plates, and pump light having the polarization distribution shown in FIG. 24D exits. The laser light (pump light) which exits is imaged onto the azopolymer layer surface of a recording medium 68 by lenses 64, 66, and the orientations of the birefringence are modulated to multiple angles and recorded.

For example, laser light having an oscillation line of 488 nm or 515 nm of an argon ion laser having sensitivity to azopolymers can be used as the pump light. Further, for example, a liquid crystal panel display used for a liquid crystal projector can be used as the spatial polarized light modulator 62. However, if a liquid crystal panel display is used without the polarization film at the light exiting side removed, it is impossible to modulate only the polarized light. Note that, as described above, in order to induce the function of a half-wave plate, it is necessary to induce birefringence of a predetermined value due to adjust the exposure conditions.

As described above, the scale can be fabricated by a single exposure by irradiating pump light, which has a polarization distribution, one time onto a recording medium so as to modulate the orientations of the birefringence to multiple angles and record the birefringence. Further, as compared with a case in which the birefringence is recorded by successively irradiating pump light having a different polarization direction per place, the birefringence can be recorded with high precision. Moreover, by changing the pattern inputted to the spatial polarized light modulator, it is possible to fabricate scales having a variety of polarization distributions.

An example of fabricating a scale by using the optical system shown in FIG. 24A will be described hereinafter. An argon ion laser having an oscillation line of 515 nm was used as the laser light source 56, and the light intensity thereof was made to be 5 W/cm². A liquid crystal panel display having a number of pixels of 640×480, with each pixel being 42 μm×42 μm, was used as the spatial polarized light modulator 62. Each pixel of the liquid crystal panel display was reduced to ⅕, and imaged on the surface of an azopolymer layer having a thickness of 6 μm. A pattern, which was such that pump light of the polarization distribution shown in FIG. 24D would be output, was inputted to the liquid crystal panel display, and the azopolymer layer was exposed for 5 seconds. In this way, a scale, which had a polarization distribution of a pattern which was the same as the polarization distribution of the pump light, was fabricated.

A second method is a method of modulating the birefringence to plural values and recording the birefringence by recording a polarization hologram. A hologram scale is a scale in which the wave face of light is directly recorded onto a graduation surface in the form of a hologram, and, in light of the principles of the method of manufacturing thereof, can realize the finest graduation pitch which is of the order of the wavelength. Thus, at an encoder using a hologram scale, it is possible to measure the amount of movement at a high resolution. In accordance with research conducted by the present inventors and others, it has been found that, when the polarization states (electric field vectors) of two recording lights are orthogonal to one another, the light intensity distribution becomes uniform within the plane, and interference fringes are not formed. However, periodic anisotropy arises in the polarization state of the merged electric field, i.e., a polarization hologram is recorded. By applying this method of recording a polarization hologram to the fabrication of scales, it is possible to obtain an advantage with regard to the principles of the method of manufacturing hologram scales, i.e., the advantage of being able to realize the finest graduation pitch which is of the order of the wavelength. Details of recording polarization holograms are disclosed in Jpn. J. Appl. Phys., Part 1 38, 5928 (1999) and the like.

Various combinations of two recording lights forming a polarization distribution, and spatial distributions of merged vectors of electric fields formed by these combinations are shown in following Table 1.

TABLE 1

| Combinations of recording lights | Spatial distributions of merged electric field vectors |
|---|---|
| S-polarized light and S-polarized light | • ↕ ↕ ↕ • |
| S-polarized light and P-polarized light | ↘ ○ ↗ ○ ↘ |
| P-polarized light and P-polarized light | ◆ ↔ ↔ ↔ ◆ |
| 45° polarized light and 45° polarized light | ■ ↗ ↗ ↗ ■ |
| 45° polarized light and −45° polarized light | ↔ ○ ↕ ○ ↔ |

TABLE 1-continued

| Combinations of recording lights | Spatial distributions of merged electric field vectors |
|---|---|
| Clockwise circularly polarized light and counter-clockwise circularly polarized light | ↔ ↗ ↕ ↘ ↔ |

For example, as shown in FIG. 25, in a case in which electric fields of circularly polarized lights which rotate in opposite directions are superposed, the merged vector of the electric fields has a spatial distribution which rotates periodically (sinusoidally). By irradiating such light onto a polarization sensitive medium formed of an azopolymer or the like, a polarization hologram can be recorded. Note that a combination of circularly polarized lights in which the two recording lights rotate in the same direction is not suited to the fabrication of scales.

Figure 26:
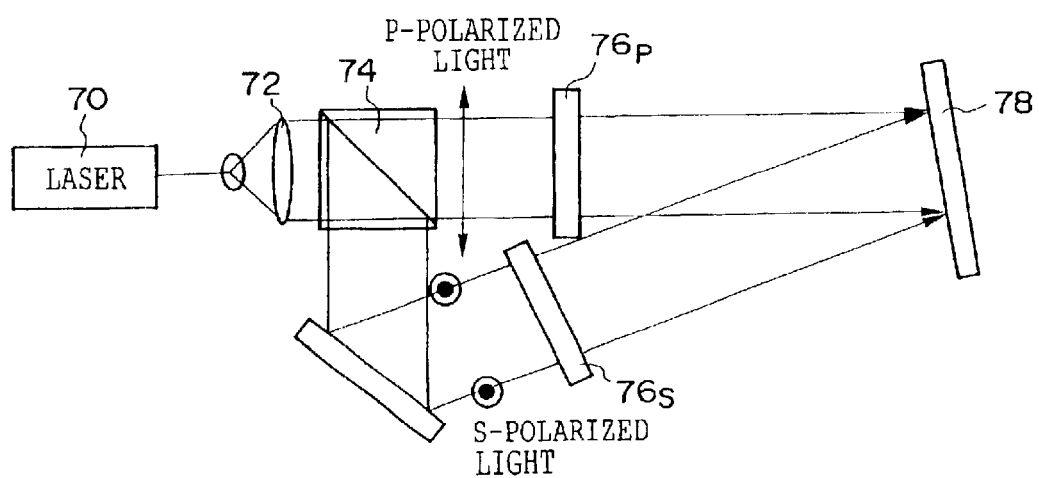
FIG. 26 is a cross-sectional view taken along an optical axis and showing the structure of an optical system for recording the polarization hologram.

FIG. 26 shows an optical system for recording a polarization hologram. By using this optical system, laser light output from a laser light source 70 is made into parallel light having a wide diameter by a collimator lens 72, and is made incident onto a polarizing beam splitter 74. The incident light is separated into an s-polarized light component and a p-polarized light component by the polarizing beam splitter 74. The s-polarized light component and the p-polarized light component are made, by polarized light rotating elements 76s, 76p, into circularly polarized lights which rotate in directions opposite to one another, and are irradiated onto a recording medium 78 so as to form a polarization hologram. The other combinations of the recording lights shown in above Table 1 as well can be realized by the settings of the polarized light rotating elements 76s, 76p. Note that, in these cases as well, as described above, in order to induce the function of a half-wave plate, it is necessary to induce birefringence of a predetermined value due to adjust the exposure conditions.

In a case in which the laser light, which is transmitted through the scale or reflected at the scale, is separated by a polarizing beam splitter into two light waves whose electric vectors are orthogonal to one another and these light waves are detected by photo-detectors respectively, when using a scale on which a polarization hologram is recorded by two recording lights whose polarization state are orthogonal to one another, the period of the signal detected at the photo-detector is ½ and a higher resolution can be realized, as compared with a case of using a scale which is recorded by two recording lights whose polarization states are not orthogonal to one another.

Figure 27:
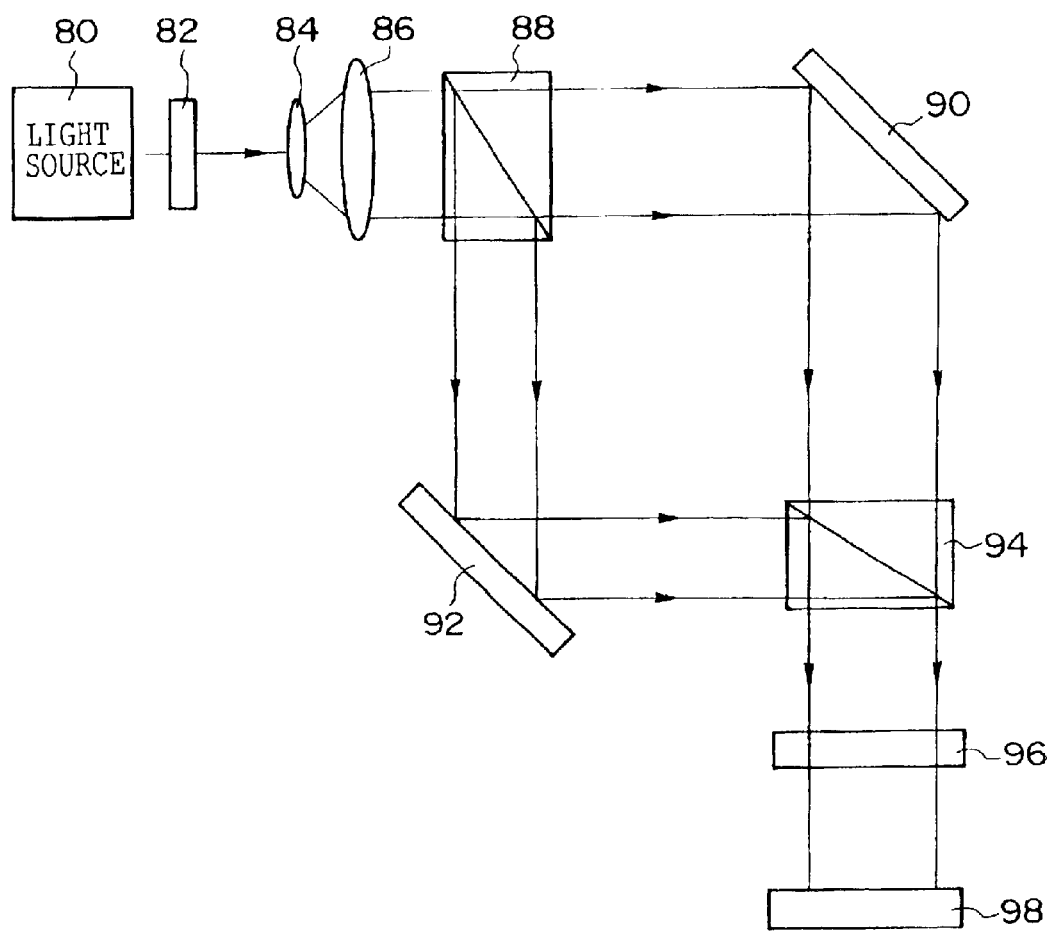
FIG. 27 is a cross-sectional view taken along an optical axis and showing the structure of an optical system for fabricating a scale by recording the polarization hologram.
Figure 28:
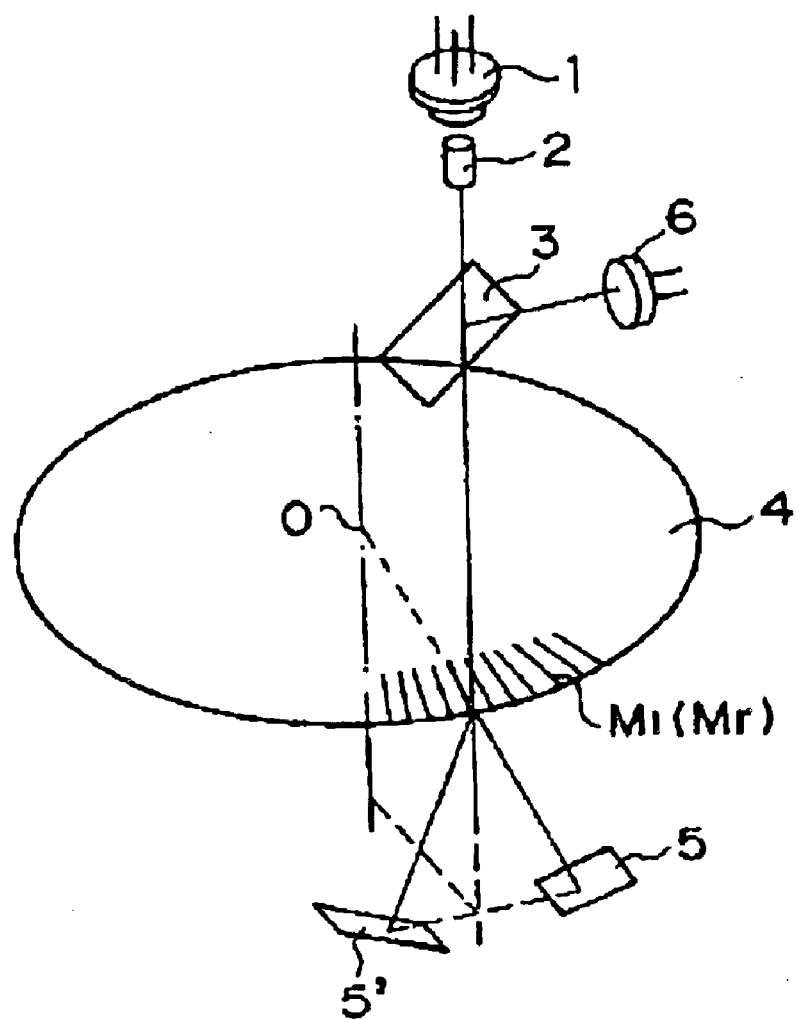
FIG. 28 is a perspective view showing the structure of a conventional optical encoder.
Figure 29:
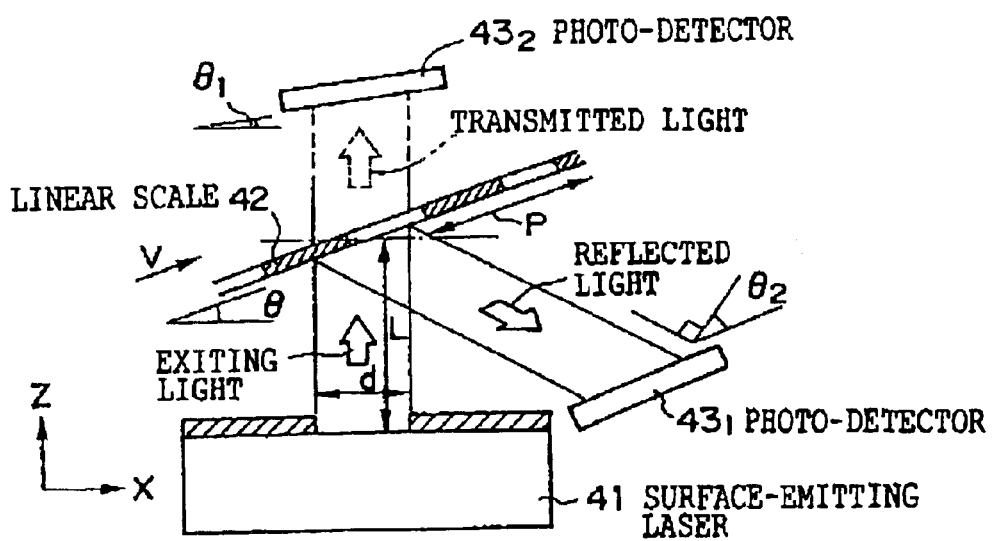
FIG. 29 is a cross-sectional view taken along an optical axis and showing another structure of a conventional optical encoder.

Next, an example of fabricating a scale by using the optical system shown in FIG. 27 will be described. An argon ion laser having an oscillation line of 515 nm was used as a laser light source 80, and the light intensity thereof was made to be 5 W/cm². The laser light output from the laser light source 80 was made incident onto a half-wave plate 82, the intensities of the p-polarized light component and the s-polarized light component were made to be the same, the light was made into parallel light of a wide diameter by collimator lenses 84, 86, and was separated into the s-polarized light and the p-polarized light by a polarizing beam splitter 88. Thereafter, the s-polarized light and the p-polarized light were reflected by reflecting mirrors 90, 92, respectively, and were merged by a polarizing beam splitter 94. The merged wave was made incident on a quarter-wave plate 96. The s-polarized light component and the p-polarized light component contained in the merged wave were made, by the quarter-wave plate 96, into circularly polarized lights rotating in mutually opposite directions, and were irradiated onto a recording medium 98 so as to expose for 5 seconds an azopolymer layer having a thickness of 6 μm. When fabricating a scale in which, as shown in FIG. 2A, nine half-wave plates were arrayed per one period such that the orientations of the half-wave plates rotated continuously in the longitudinal direction counterclockwise by 22.5° each, the length of the portion in which half-wave plates of one period were arrayed was 960 μm.

Note that, in the above, description was given of examples of fabricating a transmission-type scale by recording birefringence on an azopolymer layer by using the first method or the second method. However, provided that a material exhibiting photo-induced birefringence in the same way as an azopolymer is used, birefringence can be recorded by a method similar to recording birefringence on an azopolymer. Further, a reflection-type scale can be fabricated by a similar method.

As described above, in accordance with the present invention, there is provided an optical encoder which has excellent noise resistance and wide applicability and can detect and an exact amount of movement, and a scale which is used in this optical encoder. Further, there is provided an optical encoder and a scale for an encoder which have few parts and can be made compact.

What is claimed is:

1. An optical encoder comprising:
   an optical sensor section in which a scale and a detecting optical system are disposed so as to be one of relatively movable and relatively rotatable, and a plurality of optically anisotropic regions, which vary a polarization state of incident laser light to respectively different states, are distributed at the scale, and the detecting optical system includes a light source irradiating laser light onto the scale, a polarized light separating means separating a polarized light component of a predetermined polarization direction from laser light which has been one of transmitted through the scale and reflected by the scale, and a light intensity detecting means detecting a light intensity of the polarized light component which has been separated; and
   movement amount computing means for computing an amount of movement of the scale on the basis of a variation in light intensity detected at the optical sensor section.

2. The optical encoder of claim 1, wherein a surface-emitting laser is used as the light source.

3. The optical encoder of claim 1, wherein a polarizer, which transmits laser light of a predetermined polarization direction, is disposed between the light source and the scale.

4. The optical encoder of claim 1, wherein an aperture, which reshapes the laser light to a predetermined beam size, is disposed between the light source and the scale.

5. The optical encoder of claim 1, wherein the movement amount computing means computes the amount of movement of the scale by associating the variation in light intensity detected at the light intensity detecting means with a distribution of anisotropic orientations of the scale.

6. The optical encoder of claim 1, wherein, when the light intensity detected at the light intensity detecting means varies periodically, the movement amount computing means computes the amount of movement of the scale by associating a period of the variation in light intensity with a period of a distribution of anisotropic orientations of the scale.

7. The optical encoder of claim 1, wherein the polarized light separating means is a polarizer which transmits a linearly polarized light component of a predetermined polarization direction from incident light.

8. The optical encoder of claim 1, wherein
   the polarized light separating means separates incident light into two polarized light components having different polarization directions;
   the light intensity detecting means detects a light intensity for each polarized light component separated by the polarized light separating means; and
   the movement amount computing means computes the amount of movement of the scale by associating a variation in one of a polarization angle obtained from a light intensity ratio of the polarized light components detected at the light intensity detecting means and a light intensity difference of the polarized light components detected at the light intensity detecting means, with a distribution of anisotropic orientations of the scale.

9. The optical encoder of claim 8, wherein in a case in which one of the polarization angle obtained from the light intensity ratio of the polarized light components detected at the light intensity detecting means and the light intensity difference of the polarized light components detected at the light intensity detecting means varies periodically, the movement amount computing means computes the amount of movement of the scale by associating a period of a variation of the one of the polarization angle and the light intensity difference with a period of the distribution of the anisotropic orientations of the scale.

10. The optical encoder of claim 8, wherein the polarized light separating means is one of a combination of a polarizing beam splitter, a polarizing plate, and a polarizing film.

11. The optical encoder of claim 1, wherein interference light due to a plurality of laser lights is irradiated onto the scale.

12. The optical encoder of claim 1, wherein multiple-interference light due to interference of diffracted lights is irradiated onto the scale.

13. The optical encoder of claim 11, wherein the interference light is irradiated such that, when a distribution of anisotropic orientations of the scale is periodic, interference fringes having a pitch which is an integer multiple of a half-period of the distribution are formed on a surface of the scale.

14. The optical encoder of claim 1, wherein laser light having a polarization distribution within a beam is irradiated onto the scale.

15. The optical encoder of claim 14, wherein the laser light having a polarization distribution within the beam passes through a polarizer, which transmits laser light of a predetermined polarization direction, and is irradiated onto the scale.

16. The optical encoder of claim 1, wherein the optically anisotropic regions are distributed such that a state of variation in the detected light intensity is different in a case in which the scale and the detecting optical system are one of moved and rotated in a predetermined direction and in a case in which the scale and the detecting optical system are one of moved and rotated in a direction opposite to the predetermined direction.

17. An optical encoder comprising:
   an optical sensor section in which a scale and a detecting optical system are disposed so as to be one of relatively movable and relatively rotatable, and a plurality of optically anisotropic regions, which respectively rotate a polarization direction of incident laser light, are distributed at the scale, and the detecting optical system includes a light source irradiating laser light onto the scale, a polarized light separating means separating a polarized light component of a predetermined polarization direction from laser light which has been one of transmitted through the scale and reflected by the scale, and a light intensity detecting means detecting a light intensity of the polarized light component which has been separated; and movement amount computing means for computing an amount of movement of the scale on the basis of a variation in light intensity detected at the optical sensor section.

18. The optical encoder of claim 17, wherein a surface-emitting laser is used as the light source.

19. The optical encoder of claim 17, wherein a polarizer, which transmits laser light of a predetermined polarization direction, is disposed between the light source and the scale.

20. The optical encoder of claim 17, wherein an aperture, which reshapes the laser light to a predetermined beam size, is disposed between the light source and the scale.

21. The optical encoder of claim 17, wherein the movement amount computing means computes the amount of movement of the scale by associating the variation in light intensity detected at the light intensity detecting means with a distribution of anisotropic orientations of the scale.

22. The optical encoder of claim 17, wherein, when the light intensity detected at the light intensity detecting means varies periodically, the movement amount computing means computes the amount of movement of the scale by associating a period of the variation in light intensity with a period of a distribution of anisotropic orientations of the scale.

23. The optical encoder of claim 17, wherein the polarized light separating means is a polarizer which transmits a linearly polarized light component of a predetermined polarization direction from incident light.

24. The optical encoder of claim 17, wherein the polarized light separating means separates incident light into two polarized light components having different polarization directions;

the light intensity detecting means detects a light intensity for each polarized light component separated by the polarized light separating means; and the movement amount computing means computes the amount of movement of the scale by associating a variation in one of a polarization angle obtained from a light intensity ratio of the polarized light components detected at the light intensity detecting means and a light intensity difference of the polarized light components detected at the light intensity detecting means, with a distribution of anisotropic orientations of the scale.

25. The optical encoder of claim 17, wherein interference light due to a plurality of laser lights is irradiated onto the scale.

26. The optical encoder of claim 17, wherein multiple-interference light due to interference of diffracted lights is irradiated onto the scale.

27. The optical encoder of claim 17, wherein laser light having a polarization distribution within a beam is irradiated onto the scale.

28. The optical encoder of claim 17, wherein the optically anisotropic regions are distributed such that a state of variation in the detected light intensity is different in a case in which the scale and the detecting optical system are one of moved and rotated in a predetermined direction and in a case in which the scale and the detecting optical system are one of moved and rotated in a direction opposite to the predetermined direction.

* * * * *